: (12) United States Patent
Tomita

(10) Patent No.: US 9,754,024 B2
(45) Date of Patent: *Sep. 5, 2017

(54) VOICE RETRIEVAL APPARATUS, VOICE RETRIEVAL METHOD, AND NON-TRANSITORY RECORDING MEDIUM

(71) Applicant: Casio Computer Co., Ltd., Tokyo (JP)

(72) Inventor: Hiroki Tomita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,775

(22) Filed: Nov. 30, 2015

(65) Prior Publication Data

US 2016/0180834 A1    Jun. 23, 2016

(30) Foreign Application Priority Data

Dec. 22, 2014  (JP) ................................ 2014-259418

(51) Int. Cl.
  *G10L 15/00* (2013.01)
  *G06F 17/30* (2006.01)
  *G10L 15/02* (2006.01)

(52) U.S. Cl.
  CPC .... *G06F 17/3074* (2013.01); *G06F 17/30734* (2013.01); *G06F 17/30743* (2013.01); *G10L 2015/025* (2013.01)

(58) Field of Classification Search
  CPC .... G10L 13/08; G10L 2015/025; G10L 15/26
  USPC .............................................. 704/240, 235
  See application file for complete search history.

(56) References Cited

U.S. PATENT DOCUMENTS

2005/0203750 A1* 9/2005 Miyamoto ............ G10L 15/26
 704/276
2010/0082344 A1* 4/2010 Naik .................... G10L 13/033
 704/258

OTHER PUBLICATIONS

Zhang, Y, et al., An Inner-Product Lower-Bound Estimate for Dynamic Time Warping, ICASSP, 2011, pp. 5660-5663.

* cited by examiner

*Primary Examiner* — Jakieda Jackson
(74) *Attorney, Agent, or Firm* — Scully, Scott, Murphy & Presser, P.C.

(57) ABSTRACT

A voice retrieval apparatus executes processes of: obtaining, from a time length memory, a continuous time length for each phoneme contained in a phoneme string of a retrieval string; obtaining user-specified information on an utterance rate; changing the continuous time length for each obtained phoneme in accordance with the obtained information; deriving, based on the changed continuous time length, an utterance time length of voices corresponding to the retrieval string; specifying a plurality of likelihood obtainment segments of the derived utterance time length in a time length of a retrieval sound signal; obtaining a likelihood showing a plausibility that the specified likelihood obtainment segment is a segment where the voices are uttered; and identifying, based on the obtained likelihood, an estimation segment where, within the retrieval sound signal, utterance of the voices is estimated, the estimation segment being identified for each specified likelihood obtainment segment.

18 Claims, 13 Drawing Sheets

FIG.3

| PHONEME FOR "a" | | |
|---|---|---|
| FIRST STATE a1 | SECOND STATE a2 | THIRD STATE a3 |

(WHEN NUMBER OF STATES FOR EACH PHONEME IS "3")
 a1 : FIRST STATE INCLUDING UTTERANCE START OF PHONEME "a"
 a2 : SECOND STATE INCLUDING INTERMEDIATE STATE OF PHONEME "a"
 a3 : THIRD STATE INCLUDING UTTERANCE END OF PHINEME "a"

FIG.4

| SINGLE PHONEME |||
|---|---|---|
| FIRST STATE<br>T1×α | SECOND STATE<br>T2×α | THIRD STATE<br>T3×α |

(WHEN NUMBER OF STATES FOR EACH PHONEME IS "3")
T1 : CONTINUOUS TIME LENGTH OF FIRST STATE INCLUDING UTTERANCE START OF PHONEME
T2 : CONTINUOUS TIME LENGTH OF SECOND STATE INCLUDING INTERMEDIATE STATE OF PHONEME
T3 : CONTINUOUS TIME LENGTH OF THIRD STATE INCLUDING UTTERANCE END OF PHONEME
α : CHANGE RATE FOR CONTINUOUS TIME LENGTH

|  |  | CHANGE RATE FOR FIRST STATE | CHANGE RATE FOR SECOND STATE | CHANGE RATE FOR THIRD STATE |
|---|---|---|---|---|
| INCREASE RATE | VOWEL | 1.6 | 1.6 | 1.6 |
|  | CONSONANT | 1.1 | 1.1 | 1.1 |
| DECREASE RATE | VOWEL | 0.6 | 0.6 | 0.6 |
|  | CONSONANT | 0.9 | 0.9 | 0.9 |

FIG.5

| PHONEME NAME AND STATE | PRE-CHANGE CONTINUOUS TIME LENGTH (ms) | POST-INCREASE TIME LENGTH (ms) | POST-DECREASE TIME LENGTH (ms) |
|---|---|---|---|
| k1 | 30 | 33 | 27 |
| k2 | 20 | 22 | 18 |
| k3 | 20 | 22 | 18 |
| a1 | 20 | 32 | 12 |
| a2 | 30 | 48 | 18 |
| a3 | 20 | 32 | 12 |
| t1 | 30 | 33 | 27 |
| t2 | 20 | 22 | 18 |
| t3 | 10 | 11 | 9 |
| e1 | 20 | 32 | 12 |
| e2 | 20 | 32 | 12 |
| e3 | 30 | 48 | 18 |
| g1 | 30 | 33 | 27 |
| g2 | 40 | 44 | 36 |
| g3 | 20 | 18 | 22 |
| o1 | 20 | 32 | 12 |
| o2 | 20 | 32 | 12 |
| o3 | 30 | 18 | 48 |
| r1 | 30 | 33 | 27 |
| r2 | 20 | 22 | 18 |
| r3 | 10 | 9 | 11 |
| i1 | 40 | 64 | 24 |
| i2 | 40 | 64 | 24 |
| i3 | 50 | 30 | 80 |
| TOTAL | 620 | 852 | 456 |

RETRIEVAL SOUND SIGNAL

FIG. 10

| | SINGLE PHONEME | |
|---|---|---|
| FIRST STATE T1×α | SECOND STATE T2×α | THIRD STATE T3×α |

(WHEN NUMBER OF STATES FOR EACH PHONEME IS "3")
T1 : CONTINUOUS TIME LENGTH OF FIRST STATE INCLUDING UTTERANCE START OF PHONEME
T2 : CONTINUOUS TIME LENGTH OF SECOND STATE INCLUDING INTERMEDIATE STATE OF PHONEME
T3 : CONTINUOUS TIME LENGTH OF THIRD STATE INCLUDING UTTERANCE END OF PHINEME
α : CHANGE RATE FOR CONTINUOUS TIME LENGTH

| | | CHANGE RATE FOR FIRST STATE | CHANGE RATE FOR SECOND STATE | CHANGE RATE FOR THIRD STATE |
|---|---|---|---|---|
| INCREASE RATE | VOWEL | 1.6 | 1.6 | 1.6 |
| | CONSONANT | 1.0 | 1.0 | 1.0 |
| DECREASE RATE | VOWEL | 0.6 | 0.6 | 0.6 |
| | CONSONANT | 1.0 | 1.0 | 1.0 |

FIG.12

| SINGLE PHONEME |||
|---|---|---|
| FIRST STATE<br>T1×α1 | SECOND STATE<br>T2×α2 | THIRD STATE<br>T3×α3 |

(WHEN NUMBER OF STATES FOR EACH PHONEME IS "3")
T1 : CONTINUOUS TIME LENGTH OF FIRST STATE INCLUDING UTTERANCE START OF PHONEME
T2 : CONTINUOUS TIME LENGTH OF SECOND STATE INCLUDING INTERMEDIATE STATE OF PHONEME
T3 : CONTINUOUS TIME LENGTH OF THIRD STATE INCLUDING UTTERANCE END OF PHONEME
α1: CHANGE RATE FOR CONTINUOUS TIME LENGTH T1 OF FIRST STATE
α2: CHANGE RATE FOR CONTINUOUS TIME LENGTH T2 OF SECOND STATE
α3: CHANGE RATE FOR CONTINUOUS TIME LENGTH T3 OF THIRD STATE

| | | α1 | α2 | α3 |
|---|---|---|---|---|
| INCREASE RATE | VOWEL | 1.3 | 1.6 | 1.3 |
| | CONSONANT | 1.1 | 1.2 | 1.1 |
| DECREASE RATE | VOWEL | 0.8 | 0.6 | 0.8 |
| | CONSONANT | 0.9 | 0.8 | 0.9 |

FIG.13

| SINGLE PHONEME | | |
|---|---|---|
| FIRST STATE T1×α1 | SECOND STATE T2×α2 | THIRD STATE T3×α3 |

(WHEN NUMBER OF STATES FOR EACH PHONEME IS "3")
T1 : CONTINUOUS TIME LENGTH OF FIRST STATE INCLUDING UTTERANCE START OF PHONEME
T2 : CONTINUOUS TIME LENGTH OF SECOND STATE INCLUDING INTERMEDIATE STATE OF PHONEME
T3 : CONTINUOUS TIME LENGTH OF THIRD STATE INCLUDING UTTERANCE END OF PHONEME
α1: CHANGE RATE FOR CONTINUOUS TIME LENGTH T1 OF FIRST STATE
α2: CHANGE RATE FOR CONTINUOUS TIME LENGTH T2 OF SECOND STATE
α3: CHANGE RATE FOR CONTINUOUS TIME LENGTH T3 OF THIRD STATE

| | | α1 | α2 | α3 |
|---|---|---|---|---|
| INCREASE RATE | VOWEL | 1.0 | 1.6 | 1.0 |
| | CONSONANT | 1.0 | 1.2 | 1.0 |
| DECREASE RATE | VOWEL | 1.0 | 0.6 | 1.0 |
| | CONSONANT | 1.0 | 0.8 | 1.0 |

US 9,754,024 B2

VOICE RETRIEVAL APPARATUS, VOICE RETRIEVAL METHOD, AND NON-TRANSITORY RECORDING MEDIUM

CROSS-REFERENCE TO RELATED APPLICATION

This application claims the benefit of Japanese Patent Application No. 2014-259418, filed on Dec. 22, 2014, the entire disclosure of which is incorporated by reference herein.

FIELD

This application relates generally to a voice retrieval apparatus, a voice retrieval method, and a non-transitory recording medium.

BACKGROUND

Due to widespread popularization of multimedia contents, such as voice and motion image, there is a demand for a highly precise multimedia retrieval technology. With respect to such a technology, a voice retrieval technology that identifies a portion where voices corresponding to a retrieval term (query) subjected to retrieval is uttered in a sound signal has been studied.

As for voice retrieval, a retrieval scheme with a sufficient performance has not been established yet in comparison with character string retrieval technologies based on image recognition. Hence, various technologies have been studied in order to realize a voice retrieval with a sufficient performance.

For example, Non-patent Literature 1 (Y. Zhang and J. Glass, "An inner-product lower-bound estimate for dynamic time warping", in Proc., ICASSP, 2011, pp. 5660-5663) discloses a method of comparing sound signals with each other at a fast speed. This method enables a fast-speed identification of a portion corresponding to a query input by voice in a sound signal subjected to retrieval.

According to the technology disclosed by Non-patent Literature 1, when, however, the utterance rate of voice subjected to retrieval is different from the utterance rate of a person who has input a query, the retrieval precision decreases.

The present disclosure has been made in order to address the aforementioned technical problem, and it is an objective of the present disclosure to provide a voice retrieval apparatus, a voice retrieval method, and a non-transitory recording medium which are capable of highly precisely retrieving a retrieval term from a sound signal with a different utterance rate.

SUMMARY

In order to accomplish the above objective, a voice retrieval apparatus according to an aspect of the present disclosure includes:

a processor; and a memory that records a sound signal subjected to retrieval, wherein the processor executes following processes:

a time length obtaining process of obtaining, from a database that stores continuous time length data on a phoneme, a continuous time length for each phoneme contained in a phoneme string of a retrieval string;

an utterance rate information obtaining process of obtaining information on an utterance rate;

a time length changing process of changing the continuous time length for each of the phonemes obtained in the time length obtaining process in accordance with the information on the utterance rate obtained in the utterance rate information obtaining process;

a time length deriving process of deriving, based on the continuous time length for each of the phonemes changed in the time length changing process, an utterance time length of voices corresponding to the retrieval string;

a segment specifying process of specifying, as likelihood obtainment segments, a plurality of segments of the utterance time length derived in the time length deriving process in the sound signal subjected to retrieval;

a likelihood obtaining process of obtaining a likelihood showing a plausibility that the likelihood obtainment segment specified in the segment specifying process is a segment where voices corresponding to the retrieval string are uttered; and an identifying process of identifying, based on the likelihood obtained in the likelihood obtainment process, an estimation segment where, within the sound signal subjected to retrieval, utterance of voices corresponding the retrieval string is estimated, the estimation segment being identified for each of the likelihood obtainment segments specified in the segment specifying process.

The present disclosure enables highly precise retrieval of a retrieve term from a sound signal that has a different utterance rate.

BRIEF DESCRIPTION OF THE DRAWINGS

A more complete understanding of this application can be obtained when the following detailed description is considered in conjunction with the following drawings, in which:

FIG. 3 is a diagram to explain a phoneme state;

FIG. 4 is a diagram illustrating example utterance rate information to increase or decrease a continuous time length of each phoneme state;

FIG. 5 is a diagram illustrating an example calculation to increase or decrease a continuous time length of a phoneme state;

FIG. 10 is a diagram illustrating an example case in which a change rate for increasing or decreasing a continuous time length is set only for a continuous time length of vowel;

FIG. 12 is a diagram illustrating an example case in which a change rate for increasing or decreasing a continuous time length is set for each phoneme state; and FIG. 13 is a diagram illustrating an example case in which a change rate for increasing or decreasing a continuous time length is set only for a specific phoneme state.

DETAILED DESCRIPTION

Figure 1:
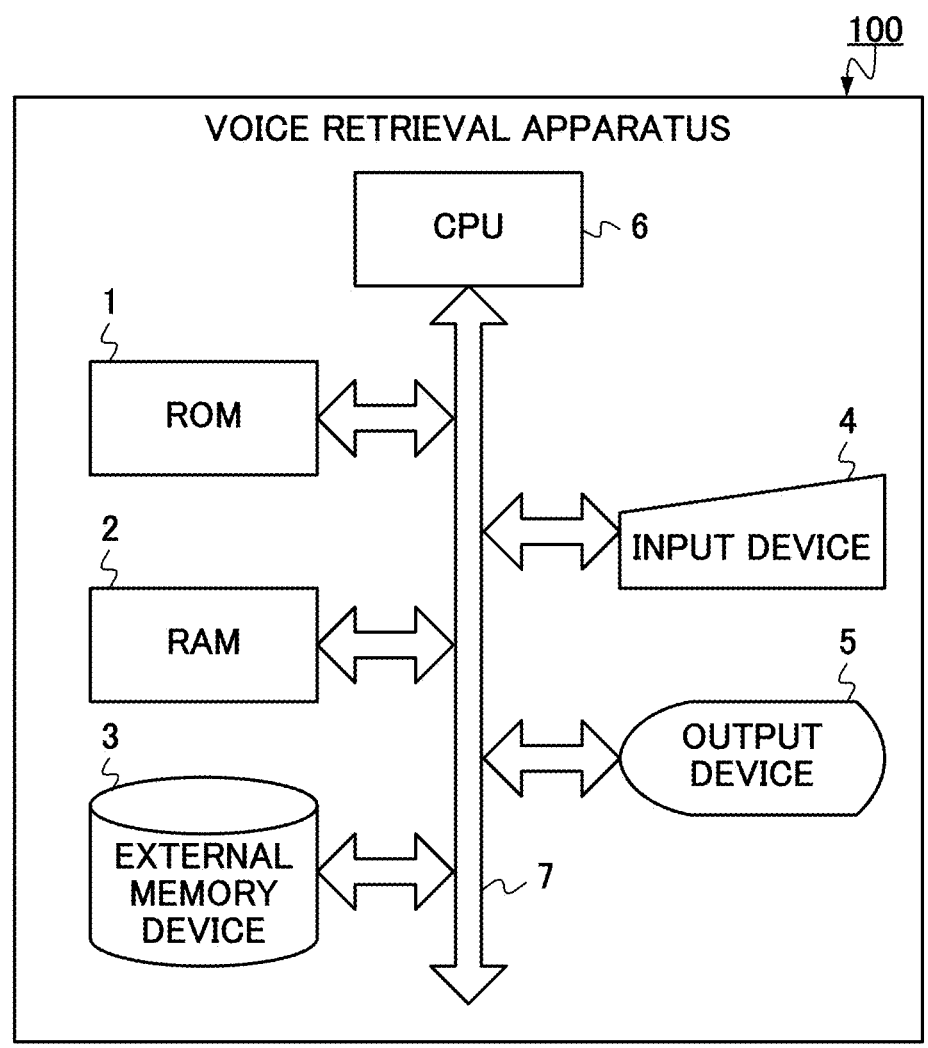
FIG. 1 is a diagram illustrating a physical structure of a voice retrieval apparatus according to a first embodiment of the present disclosure.

An explanation will be given of a voice retrieval apparatus, a voice retrieval method, and a program according to embodiments of the present disclosure with reference to the figures. The same or equivalent part throughout the figures will be denoted by the same reference numeral.

First Embodiment

A voice retrieval apparatus 100 according to a first embodiment includes, as illustrated in FIG. 1, as a physical structure, a Read-Only Memory (ROM) 1, a Random Access Memory (RAM) 2, an external memory device 3, an input device 4, an output device 5, a Central Processing Unit (CPU) 6, and a bus 7.

The ROM 1 stores a voice retrieval program. The RAM 2 is utilized as a work area for the CPU 6.

The external memory device 3 includes, for example, a hard disk, and stores data on a sound signal subjected to retrieval (hereinafter, referred to as a retrieval sound signal), a mono-phone model, a tri-phone model, and a phoneme time length to be explained later.

The input device 4 includes, for example, a keyboard and a voice recognition device. The input device 4 supplies, to the CPU 6, text data that is a retrieval term input by a user. The output device 5 includes, for example, a screen like a liquid crystal display, a speaker, and the like. The output device 5 displays, on the screen, the text data output by the CPU 6, and outputs, from the speaker, voice data.

The CPU 6 reads the voice retrieval program stored in the ROM 1 and to the RAM 2, and executes the voice retrieval program, thereby accomplishing the functions to be explained later. The bus 7 connects the ROM 1, the RAM 2, the external memory device 3, the input device 4, the output device 5, and the CPU 6 one another.

Figure 2:
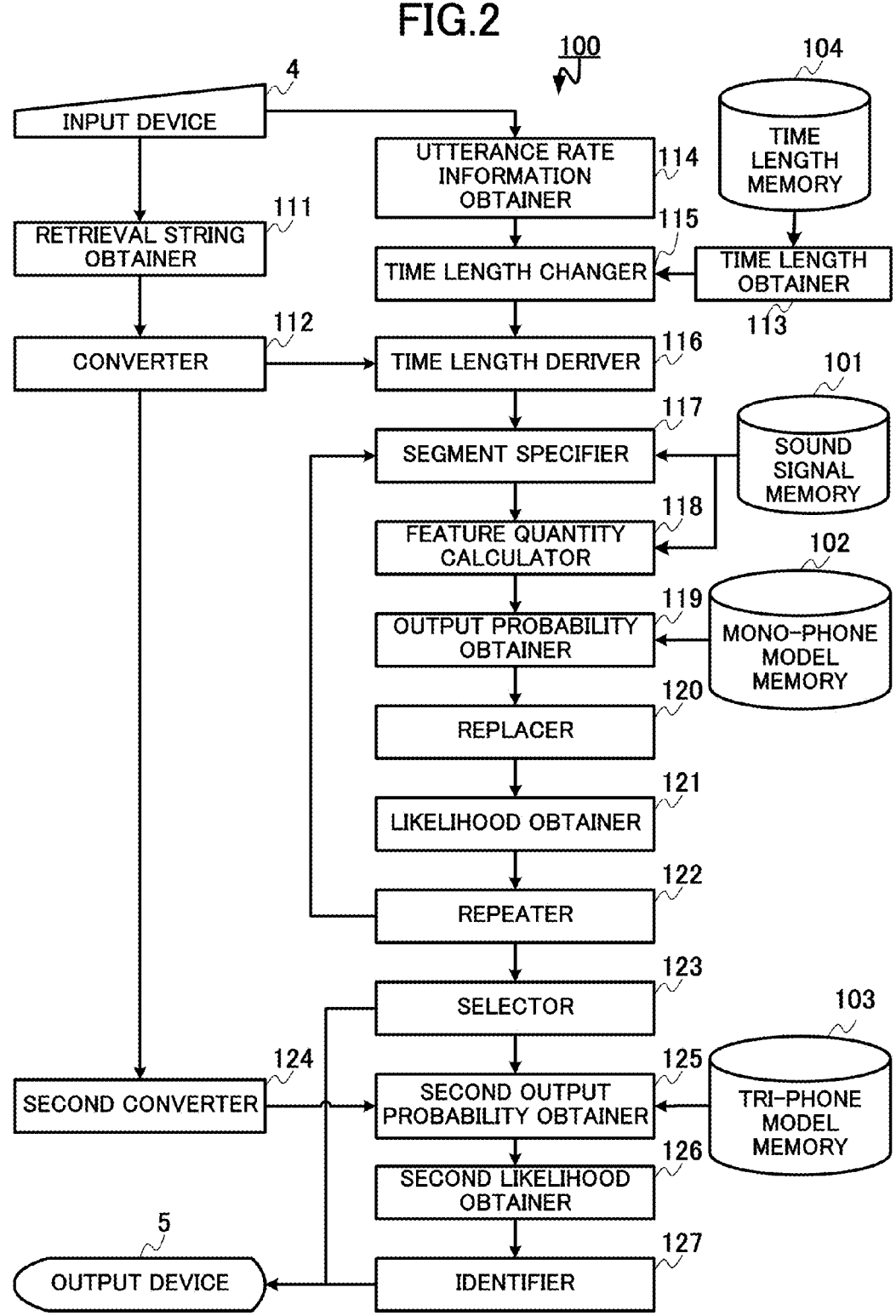
FIG. 2 is a diagram illustrating a functional structure of the voice retrieval apparatus according to the first embodiment of the present disclosure.

The voice retrieval apparatus 100 includes, as illustrated in FIG. 2, as a functional structure, a sound signal memory 101, a mono-phone model memory 102, a tri-phone model memory 103, a time length memory 104, a retrieval string obtainer 111, a converter 112, a time length obtainer 113, an utterance rate information obtainer 114, a time length changer 115, a time length deriver 116, a segment specifier 117, a feature quantity calculator 118, an output probability obtainer 119, a replacer 120, a likelihood obtainer 121, a repeater 122, a selector 123, a second converter 124, a second output probability obtainer 125, a second likelihood obtainer 126, and an identifier 127. The sound signal memory 101, the mono-phone model memory 102, the tri-phone model memory 103, and the time length memory 104 are constructed in the memory area of the external memory device 3.

The sound signal memory 101 stores the retrieval sound signal. Example retrieval sound signals are sound like news broadcasting, recorded sound of meeting, recorded sound of lecture meeting, and movie sound.

The mono-phone model memory 102 and the tri-phone model memory 103 store respective acoustic models. The acoustic model is modeled frequency characteristics of each phoneme that constructs a character string that is obtainable as a retrieval string. More specifically, the mono-phone model memory 102 stores an acoustic model (mono-phone model) on the basis of a mono-phone (a phoneme), and the tri-phone model memory 103 stores an acoustic model (tri-phone model) on the basis of tri-phones (3 phonemes).

The term phoneme is a unit of component that constructs voices uttered by a person who utters a term. For example, a term "category" contains 8 phonemes that are "k", "a", "t", "e", "g", "o", "r", and "i".

The mono-phone model is an acoustic model created for each phoneme, and is an acoustic model that does not depend on adjacent phonemes, that is, an acoustic model which has a fixed state transition relative to previous and subsequent phonemes. The tri-phone model is an acoustic model created for each 3 phonemes, and is an acoustic model that depends on adjacent phonemes, that is, an acoustic model that has the state transition taken into consideration relative to the previous and subsequent phonemes. The tri-phone model contains a larger amount of information than that of the mono-phone model. The voice retrieval apparatus 100 learns the mono-phone model and the tri-phone model through a general scheme, and stores the mono-phone model and the tri-phone model in the mono-phone model memory 102 and the tri-phone model memory 103, respectively, and beforehand.

An example acoustic model applicable as the mono-phone model and the tri-phone model is, for example, a Hidden Markov Model (HMM) that is utilized in general voice recognition technologies. The HMM is a model to stochastically estimate, from a sound signal, phonemes that construct such a sound signal by a statistical scheme. Utilized as for the HMM is a standard pattern that has parameters which are a transition probability showing a fluctuation of a state in a time, and a probability (output probability) that a feature quantity input in each state is output.

The time length memory 104 stores, in the unit of each phoneme state, an average continuous time length of each phoneme utilized in the acoustic model. The average continuous time length of each phoneme is an average time length when each phoneme is uttered. The state of each phoneme is a unit obtained by subdividing each phoneme in a direction of time, and is equivalent to the minimum unit of the acoustic model. Each phoneme has a number of states defined beforehand.

In this embodiment, an explanation will be given of an example case in which the number of states defined for each phoneme is "3". For example, a phoneme "a" is divided into three states that are a first state "a1" including the start of utterance of this phoneme, a second state "a2" which is the intermediate state, and a third state "a3" including the end of utterance as illustrated in FIG. 3. That is, a phoneme is constructed by three states. When the number of all phonemes utilized in the acoustic model is Q, there are (3×Q) number of states. The voice retrieval apparatus 100 calculates, for each phoneme state, an average value of the continuous time length based on a large quantity of data on sound signals, and stores a calculation result in the time length memory 104 beforehand.

The retrieval string obtainer 111 obtains a retrieval string input by the user via the input device 4. That is, the user gives, to the voice retrieval apparatus 100, a character string (text) that is a retrieval term (query) to retrieve a portion of the retrieval sound signal where target voices are uttered.

The converter 112 arranges, in sequence, the phonemes of the mono-phone model that does not depend on the adjacent phonemes in accordance with the retrieval string obtained by the retrieval string obtainer 111, and converts the retrieval string into a phoneme string. That is, the converter 112 arranges the phonemes (mono-phones) in sequence when each character is uttered in the same sequence as the characters contained in the retrieval string, thereby converting the retrieval string into a mono-phone phoneme string.

In this embodiment, an explanation will be given of an example case in which a Japanese term "category" is to be retrieved. When, as the retrieval string, a Japanese term "category" is input, such a term "category" contains 8 phonemes (mono-phones) that are "k", "a", "t", "e", "g", "o", "r", and "i", and thus the converter 112 creates a phoneme string that is "k, a, t, e, g, o, r, i".

The time length obtainer 113 obtains, from the time length memory 104, the average continuous time length for each phoneme state corresponding to the phoneme string created by the converter 112.

The utterance rate information obtainer 114 obtains utterance rate information input by the user via the input device 4. The utterance rate information is information that indicates a change rate to increase or decrease the average continuous time length of each phoneme state stored in the time length memory 104 in accordance with the utterance rate of the retrieval sound signal. When the retrieval sound signal is slower than an average utterance rate, in order to increase the average continuous time length of each phoneme state stored in the time length memory 104, the user inputs information to the effect that the utterance rate of the retrieval sound signal is slow. When, for example, a document that needs a time of 100 seconds if read at the utterance rate of the average continuous time length of voice data which is a source to create the continuous time length stored in the time length memory 104 is read by substantially 140 seconds, the user inputs utterance rate information (change rate) to the effect that the average continuous time length is multiplied by 1.4 times.

In this embodiment, the change rate that changes the average continuous time length of each phoneme state is applied as the utterance rate information. This will be explained in more detail with reference to FIG. 4. A phoneme has three states from the first state to the third state. In addition, a continuous time length of the first state, a continuous time length of the second state, and a continuous time length of the third state are indicated as T1, T2, and T3, respectively. A symbol α is a change rate to increase or decrease the continuous time length.

An explanation will be given of an example case in which a continuous time length corresponding to an utterance rate substantially 1.4 times slower (longer time for reading document) is created relative to the utterance rate of the sound signal that is the source of the created continuous time length stored in the time length memory 104 based on an increase rate as illustrated in FIG. 4. Since the utterance rate of the retrieval sound signal is substantially 1.4 times slower than the utterance rate of the sound signal that is the creation sources, the continuous time length of the phoneme state utilized for retrieval is increased by substantially 1.4 times. Conversely, as for a change in continuous time length relative to the change in utterance rate, a change in vowel tends to be larger than a change in consonant. In consideration of such a tendency, the increase rate for the continuous time length of vowel is set to be 1.6 times, while the increase rate for consonant is set to be 1.1 times. Accordingly, the utterance rate information that increases the average continuous time length to be substantially 1.4 times is set up. In this embodiment, an explanation will be given of an example case in which the change rate for each state is set uniformly.

In addition, as for the utterance rate information to create a continuous time length corresponding to an utterance rate that is substantially 0.7 times faster (shorter time for reading document) relative to the utterance rate of the sound signal that is the source of creating the continuous time length stored in the time length memory 104, the field of decrease rate in FIG. 4 shows example utterance rate information (change rate) that has a decrease rate of 0.6 times for the continuous time length of vowel, and a decrease rate of 0.9 times for the continuous time length of consonant.

The time length changer 115 changes the average continuous time length of each phoneme state obtained by the time length obtainer 113 in accordance with the utterance rate information obtained by the utterance rate information obtainer 114.

An explanation will be given of an example case in which, with reference to FIG. 5, the average continuous time length of each phoneme state stored in the time length memory 104 is changed based on the utterance rate information illustrated in FIG. 4. The Japanese term "category" is constructed by phonemes that are "k, a, t, e, g, o, r, i", and each phoneme has three states from the first state to the third state. The first row in FIG. 5 shows 24 states corresponding to the phoneme string "k, a, t, e, g, o, r, i". The average continuous time length for each phoneme state obtained from the time length memory 104 is shown as pre-change continuous time length in the second row. The third row shows a creation result of a continuous time length applied for an utterance rate substantially 1.4 times slower than the utterance rate of sound data that is the source of creating the continuous time length. In order to create such a continuous time length, the average continuous time length of consonant shown in the second row is increased by 1.1 times, and the average continuous time length of vowel is increased by 1.6 times. The fourth row shows a creation result of a continuous time length applied for an utterance rate substantially 0.7 times faster than the utterance rate of the sound data that is the source of creating the time length. In this case, the average continuous time length of consonant in the second row is decreased by 0.9 times, and the average continuous time length of vowel is decreased by 0.6 times. In this way, the time length changer 115 increases or decreases the average continuous time length obtained from the time length memory 104 in accordance with the obtained utterance rate information. The increased or decreased continuous time length is stored in the RAM 2 or in the external memory device 3.

The time length deriver 116 obtains, from the time length changer 115, the continuous time length for each phoneme state contained in the phoneme string output by the converter 112. Next, based on the obtained continuous time length, the time length deriver 116 derives a time length of voices (hereinafter, referred to as an utterance time length) corresponding to the retrieval string.

That is, in order to retrieve a retrieval query in the sound signal that has a different utterance rate, the voice retrieval apparatus 100 has the utterance rate information input in accordance with the utterance rate of the retrieval sound signal, thereby changing the average continuous time length stored in the time length memory 104 to the continuous time length adopted for the utterance rate. Next, based on the changed continuous time length for each phoneme state, the voice retrieval apparatus 100 derives the utterance time length of voices corresponding to the retrieval string obtained by the retrieval string obtainer 111.

More specifically, first, the time length deriver 116 obtains, based on a total of 24 states of 8 phonemes that are "k, a, t, e, g, o, r, i" subjected to retrieval, the changed continuous time lengths from the time length changer 115. A time length obtained by adding the obtained and changed 24 continuous time lengths is derived as the utterance time length of voices corresponding to the retrieval string. When the utterance rate information to the effect that the utterance rate of the retrieval sound signal is substantially 1.4 times slower than the utterance rate of sound data for creating the continuous time length is obtained, a total (852 ms) shown in the lower column of the third row in FIG. 5 is equivalent to the utterance time length corresponding to the utterance rate that is substantially 1.4 times slower.

Returning to FIG. 2, the segment specifier 117 obtains the retrieval sound signal from the sound signal memory 101, and specifies, from the header of the retrieval sound signal in sequence, the segment of the utterance time length derived by the time length deriver 116 as a likelihood obtainment segment. The term likelihood is an indicator that shows a similarity level between voices subjected to retrieval and the phoneme string corresponding to the retrieval string created from the acoustic model. In order to compare the phoneme string converted from the retrieval string with the sound signal, the segment specifier 117 takes out the sound signal portion within the specified likelihood obtainment segment, and associates each frame contained in the taken-out sound signal portion with each phoneme state contained in the phoneme string. More specifically, as for the 24 states from "k1" to "i3" illustrated in FIG. 5, 24 frames contained in the taken-out sound signal portion are associated with 24 states that construct the phoneme string, respectively.

Figure 6A:
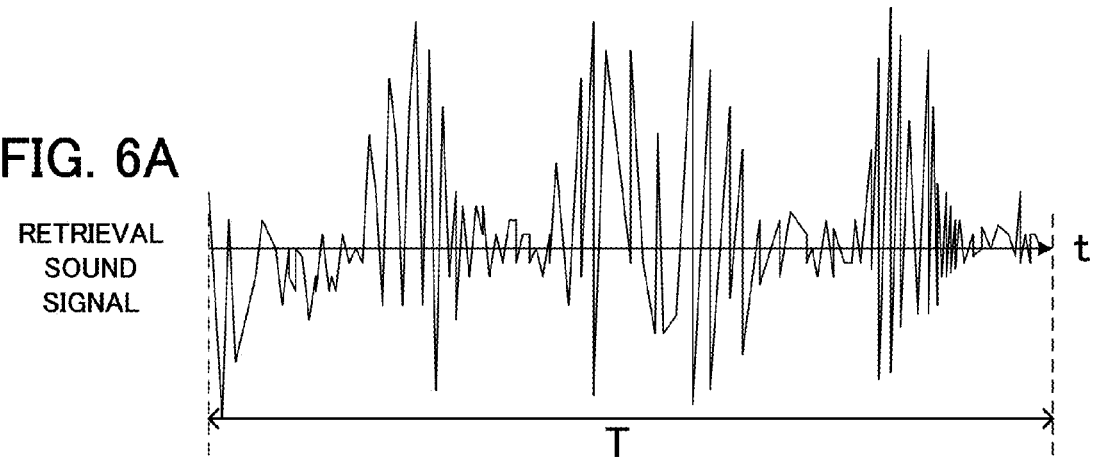
FIG. 6A is a waveform diagram of a sound signal subjected to retrieval.
Figure 6B:
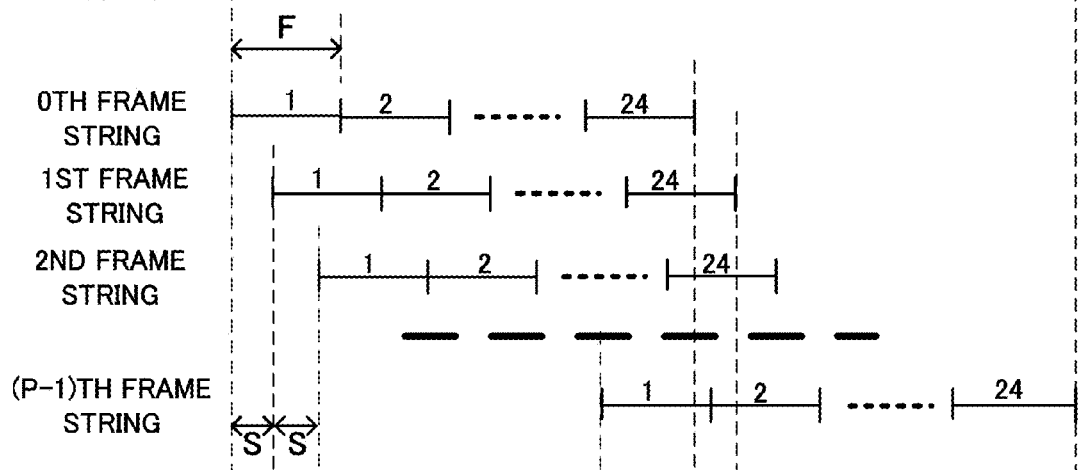
FIG. 6B is a diagram illustrating a frame set in the sound signal subjected to retrieval.

The term frame is a time window that has a time length corresponding to a phoneme state. More specifically, the frame that is set in the retrieval sound signal will be explained with reference to FIGS. 6A, 6B and 6C. FIG. 6A is a waveform diagram of retrieval sound signal with a time length T from the header to the last. The vertical axis represents an amplitude of waveform, while the horizontal axis represents a time t. FIG. 6B illustrates a frame that is set in the sound signal illustrated in FIG. 6A. The first line indicates a 0th frame string beginning from the header of the sound signal. Since the number of phonemes contained in the Japanese term "category" is eight and there are 24 phoneme states, the number of frames contained in the 0th frame string is 24. A first frame string in the second line is set so as to be shifted from the header of the sound signal by a predetermined shift length S. The first frame string also has 24 frames. Subsequently, the header position of the frame string is likewise shifted by the shift length S, and setting is made up to a (P−1)th frame string.

The continuous time length varies depending on the phoneme state, and the continuous time length is changed based on the utterance rate information. Hence, the continuous time length varies depending on the utterance rate. Since the frame is a time window corresponding to the phoneme state, the frame length varies depending on the utterance rate and the phoneme state.

The shift length S is a length to define the precision of a retrieval position to retrieve at which position in the sound signal the retrieval term is present. The shift length S is set to a fixed and shorter value than the frame length. In this embodiment, an example required precision is equal to or smaller than 10 ms. In addition, since the shortest continuous time length in FIG. 5 is 9 ms, the shift length S is set to be 5 ms that is shorter than those two values.

Figure 6C:
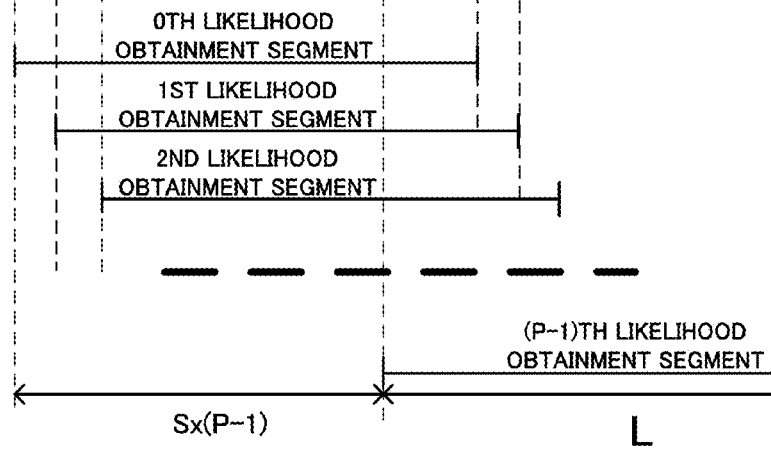
FIG. 6C is a diagram illustrating a likelihood obtainment segment specified in the sound signal subjected to retrieval.

FIG. 6C illustrates a likelihood obtainment segment specified by the segment specifier 117 in the retrieval sound signal. First of all, the segment specifier 117 specifies the segment of the 0th frame string containing the 24 frames and beginning from the header of the sound signal as a 0th likelihood obtainment segment with a time length L. Next, the segment of the first frame beginning from the position shifted by the shift length S (=10 ms) from the header of the sound signal is specified as a first likelihood obtainment segment. Likewise, the frame string is shifted by the shift length S (=10 ms), and the likelihood obtainment segment up to the (P−1)th likelihood obtainment segment is specified in sequence.

Returning to FIG. 2, the feature quantity calculator 118 calculates, for each frame, the feature quantity of the retrieval sound signal within the likelihood obtainment segment specified by the segment specifier 117. The feature quantity is obtainable by combining a frequency-axis-system feature parameter obtained by converting sound data on the frequency axis with a power-system parameter obtained by calculating a square sum of the energy of sound data and a logarithm thereof.

For example, as is conventionally well-known, the feature quantity comprises a 38-dimensional vector quantity with a total of 38 components: 12 components of the frequency-axis-system feature parameter (12 dimensions) and 1 component of the power-system feature parameter (1 dimension); a difference between each component of the present window and the previous time window, that is, 12 components of the Δ frequency-axis-system feature parameter (12 dimensions) and 1 component of the Δ power-system feature parameter (1 dimension); and a difference between a difference of each component of the present time window and the previous time window, that is, 12 components of the ΔΔ frequency-axis-coordinate feature parameter.

The output probability obtainer 119 obtains, for each frame, a probability (output probability) that the feature quantity is output from each phoneme contained in the phoneme string based on the feature quantity calculated by the feature quantity calculator 118. More specifically, the output probability obtainer 119 obtains, from the mono-phone model memory 102, the mono-phone model, and compares the feature quantity in each frame calculated by the feature quantity calculator 118 with the mono-phone model in the corresponding state to this frame in the phoneme states contained in the phoneme string. Next, the probability that the feature quantity in each frame is output from the corresponding state is calculated. The output probability obtainer 119 calculates, for each of 24 frames contained in the likelihood obtainment segment, the output probability.

The replacer 120 replaces each output probability obtained by the output probability obtainer 119 with the maximum output probability value in the adjacent several previous and subsequent frames. This replacement process is called Lower-Bounding.

Figure 7:
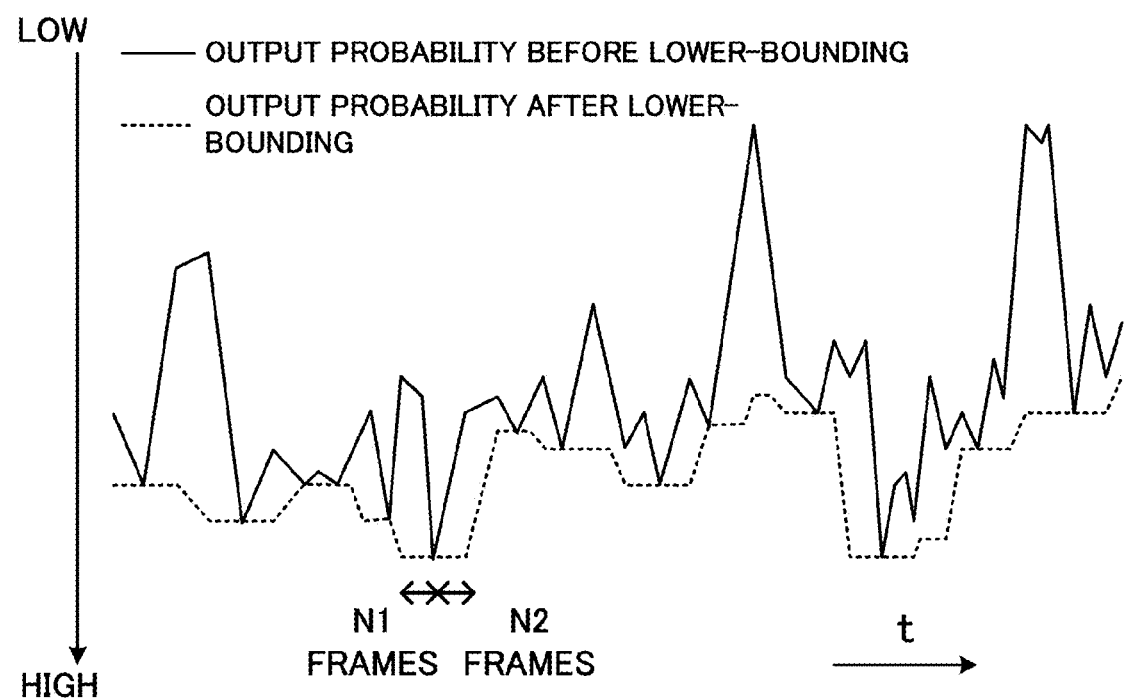
FIG. 7 is a diagram illustrating an example way of performing Lower-Bounding on an output probability.

More specifically, with reference to FIG. 7, the Lower-Bounding will be explained. In FIG. 7, a continuous line indicates an output probability obtained for each frame. The vertical axis indicates the height of the output probability so as to increase toward the bottom, and the horizontal axis indicates a time t. The replacer 120 replaces the output probability of each frame with the maximum output probability in this frame, N1 number of previous frames, and N2 number of subsequent frames. N1 and N2 are both natural numbers including zero, but either N1 or N2 is not zero. An explanation will be given of a case in which N1=N2=2. The output probability of the first frame in the frame string is replaced with the maximum output probability in the first frame, the subsequent second and third frames since there is no frame previous to the first frame. The output probability of the second frame is replaced with the maximum output probability in the previous first frame, the second frame, and subsequent third and fourth frames. The output probability of the third frame is replaced with the maximum output probability in the previous first and second frames, the third frame, and the subsequent fourth and fifth frames. In this way, the replacement process is performed up to the 24th frame. Upon replacement, the output probability indicated by the continuous line is converted to an output probability that has a small change in value along a time direction like an LB (Lower-Bounding) output probability indicated by a dashed line.

By such Lower-Bounding, an error between the continuous time length of each phoneme obtained by the time length converter 115 and the actual continuous time length of sound signal, and an error between the utterance time length of voices corresponding to the retrieval string derived by the time length deriver 116 and the actual utterance time length of sound signal are reduced within previous and subsequent several frames.

The likelihood obtainer 121 obtains a likelihood that shows a plausibility of the likelihood obtainment segment specified by the segment specifier 117 where voices corresponding to the retrieval string are uttered based on the output probability having undergone the replacement process by the replacer 120. More specifically, the likelihood obtainer 121 adds the values obtained by getting a logarithm of each output probability having undergone the replacement process across the 24 frames from the header of the likelihood obtainment segment to the last thereof to obtain the product of sequential output probabilities, and obtains the likelihood of this likelihood obtainment segment. That is, the more the likelihood obtainment segment contains frames with a high output probability, the larger the likelihood to be obtained by the likelihood obtainer 121 becomes.

Note that this is a process of multiplying the output probabilities of the respective frames, and thus the output probabilities may be directly multiplied without getting a logarithm, or an approximation formula may be applied instead of the logarithm.

The repeater 122 controls the respective components so as to change the specified segment in the sound signal portion in the likelihood obtainment segment specified by the segment specifier 117, and to cause the segment specifier 117, the feature quantity calculator 118, the output probability obtainer 119, the replacer 120, and the likelihood obtainer 121 to repeat respective processes.

More specifically, with reference to FIGS. 6B and 6C, under the control of the repeater 122, the segment specifier 117 shifts the header position of the frame by the shift length S (=10 ms) to specify the first frame string, and newly specifies the segment of the first frame string as a first likelihood obtainment segment. Next, the repeater 122 causes the respective components to repeat the processes of the respective components from the feature quantity calculator 118 to the likelihood obtainer 121 in this newly specified first likelihood obtainment segment, thereby obtaining the likelihood of the first likelihood obtainment segment.

Likewise, the repeater 122 causes the segment specifier 117 to shift the specifying likelihood obtainment segment by the shift length S (=10 ms) from the second likelihood obtainment segment to the (P−1)th likelihood obtainment segment, thereby controlling the respective components to obtain the likelihood in each likelihood obtainment segment.

Consequently, for each likelihood obtainment segment obtained by shifting the retrieval sound signal by the shift length S, the likelihood for the phoneme string "k, a, t, e, g, o, r, i" created based on the mono-phone model is obtained. Note that a number P of the likelihood obtainment segments specifiable in the retrieval sound signal is defined as P=(T−L+S)/S where T is the time length of the sound signal, L is the time length of the likelihood obtainment segment, and S is the shift length.

The selector 123 selects, in the order of higher likelihood, x number of candidate estimate segments where the utterance of voice corresponding to the retrieval string is estimated in the likelihood obtainment segments specified by the segment specifier 117 based on the likelihood obtained by the likelihood obtainer 121. That is, in order to reduce the calculation amount for a further precise likelihood obtainment based on the tri-phone model at a later stage, the selector 123 preliminary selects x number of segments that will be candidates of a final retrieval result from the P number of likelihood obtainment segments from which the respective likelihoods have been obtained, and excludes the remaining likelihood obtainment segments from the candidates.

At this time, since the likelihood obtainment segments specified by the segment specifier 117 have a large number of overlap portions, the segments where the likelihood is high often present in sequence in time series. Hence, when the selector 123 simply selects, in the order of higher likelihood, the candidate estimation segments among the P number of likelihood obtainment segments, a possibility that the selected segments are concentrated at a portion of the retrieval sound signal increases.

In order to avoid this occasion, the selector 123 sets a predetermined selection time length, and selects, for each selection time length, the likelihood obtainment segment with the maximum likelihood one by one among the likelihood obtainment segments beginning within the predetermined selection time length. The predetermined selection time length is set to be shorter than the time length L of the likelihood obtainment segment like a time length corresponding to 1/m (for example, ½) of the time length L of the likelihood obtainment segment. When, for example, the utterance time length of the Japanese term "category" is assumed as being equal to or longer than 2 seconds (L≥2 seconds), the value m is set to be m=2, and the selection time length is set to be 1 second. The likelihood obtainment segment is selected one by one as a candidate for each selection time length (L/m), and the others are excluded from the candidates. Hence, the selector 123 is capable of sufficiently selecting the candidate estimation segments across the whole retrieval sound signal.

A selection result by the selector 123 is displayed to the exterior via the screen of the output device 5. Next, the voice retrieval apparatus 100 executes a likelihood obtaining process with a higher precision on the x number of selected segments based on the tri-phone model and a Dynamic Programming (DP) matching technique. The DP matching is a scheme of selecting a state transition so as to maximize the likelihood in the analysis segment. As for the tri-phone model, the state transition relative to previous and subsequent phonemes needs to be taken into consideration. Hence, the state transition relative to previous and subsequent phonemes is determined in such a way that the likelihood of the likelihood obtainment segment is maximized by DP matching.

The second converter 124 arranges the phonemes of the tri-phone model that is the second acoustic model depending on adjacent phonemes in sequence in accordance with the retrieval string obtained by the retrieval string obtainer 111, thereby converting the retrieval string into a tri-phone phoneme string that is a second phoneme string. When, for example, the Japanese term "category" is input as the retrieval string, the term "category" contains six tri-phones that are "k–a+t", "a–t+e", "t–e+g", "e–g+o", "g–o+r", and "o–r+i". Thus, the second converter 124 creates a tri-phone phoneme string containing such six tri-phones arranged in sequence. In addition, bi-phones "k+a" and "r–i" each containing two phonemes may be allocated to the beginning and the last. In this case, the bi-phone model may be stored in the external memory device 3 beforehand. Note that a phoneme located at the left side of the symbol "–" is located prior to a center phoneme, and a phoneme located at the right side of the symbol "+" is located subsequent to the center phoneme.

The second output probability obtainer 125 obtains, for each frame, the output probability that the feature quantity of retrieval sound signal in the selected segment as the candidate estimation segment by the selector 123 is output from each phoneme contained in the second phoneme string (tri-phone phoneme string) converted by the second converter 124. More specifically, the second output probability obtainer 125 obtains, from the tri-phone model memory 103, the tri-phone model, and compares the feature quantity in each frame calculated by the feature quantity calculator 118 with each tri-phone model contained in the tri-phone phoneme string. Next, the output probability that the feature quantity is output from each tri-phone in each frame is calculated.

The second likelihood obtainer 126 obtains, for each candidate segment limited by the selector 123 into the x number, a second likelihood showing the plausibility that the selected segment as the candidate estimation segment by the selector 123 is the segment where voices corresponding to the retrieval string are uttered. The second likelihood is obtained based on the tri-phone phoneme string that is the second phoneme string. Accordingly, the second likelihood is an indicator with a higher precision than the likelihood obtained by the likelihood obtainer 121 based on the mono-phone phoneme string.

The second likelihood obtainer 126 retrieves, for each frame contained in the second likelihood obtainment segment limited by the selector 123, an association between the feature quantity of the sound signal and each tri-phone model contained in the tri-phone phoneme string by DP matching based on the output probability obtained by the second output probability obtainer 125. Next, by adding values obtained by taking a logarithm of the output probability obtained for each frame in the segment (second likelihood obtainment segment) selected by the selector 123, the second likelihood in this segment is obtained.

The identifier 127 identifies, among the x number of candidate segments selected by the selector 123, the estimation segment where the utterance of voices corresponding to the retrieval string is estimated in the retrieval sound signal based on the second likelihood obtained by the second likelihood obtainer 126. For example, the identifier 127 identifies, as the estimation segments, a predetermined number of segments in the order of larger second likelihood obtained by the second likelihood obtainer 126. Alternatively, the identifier 127 identifies, as the estimation segment, the segment that has the likelihood equal to or larger than a predetermined value. The positional information on the segment identified by the identifier 127 is displayed to the exterior via the screen of the output device 5 as a final retrieval result.

An explanation will be given of a voice retrieval process executed by the voice retrieval apparatus 100 employing the above physical structure and functional structure with reference to the flowchart of FIG. 8.

The user stores the continuous time length for each phoneme state in the time length memory 104 beforehand, thereby storing data on the retrieval sound signal in the sound signal memory 101 beforehand. An example retrieval sound signal is recorded sound of a 1-hour lecture meeting. An example query in this case is "category". In addition, the user prepares the utterance rate information indicating how much the utterance rate of the retrieval sound signal is faster than the utterance rate of sound data that is the source of a continuous time length to be created. In this case, an explanation will be given of a process of detecting the query "category" subjected to retrieval from the sound signal with a substantially 1.4 times faster utterance rate than the utterance rate of the sound data that is the source of a continuous time length to be created. In addition, a ratio of change rate between vowel and consonant when the continuous time length is increased or decreased is determined beforehand. In this case, the increase rate shown in FIG. 4 is applied as the prepared utterance rate information.

Figure 8:
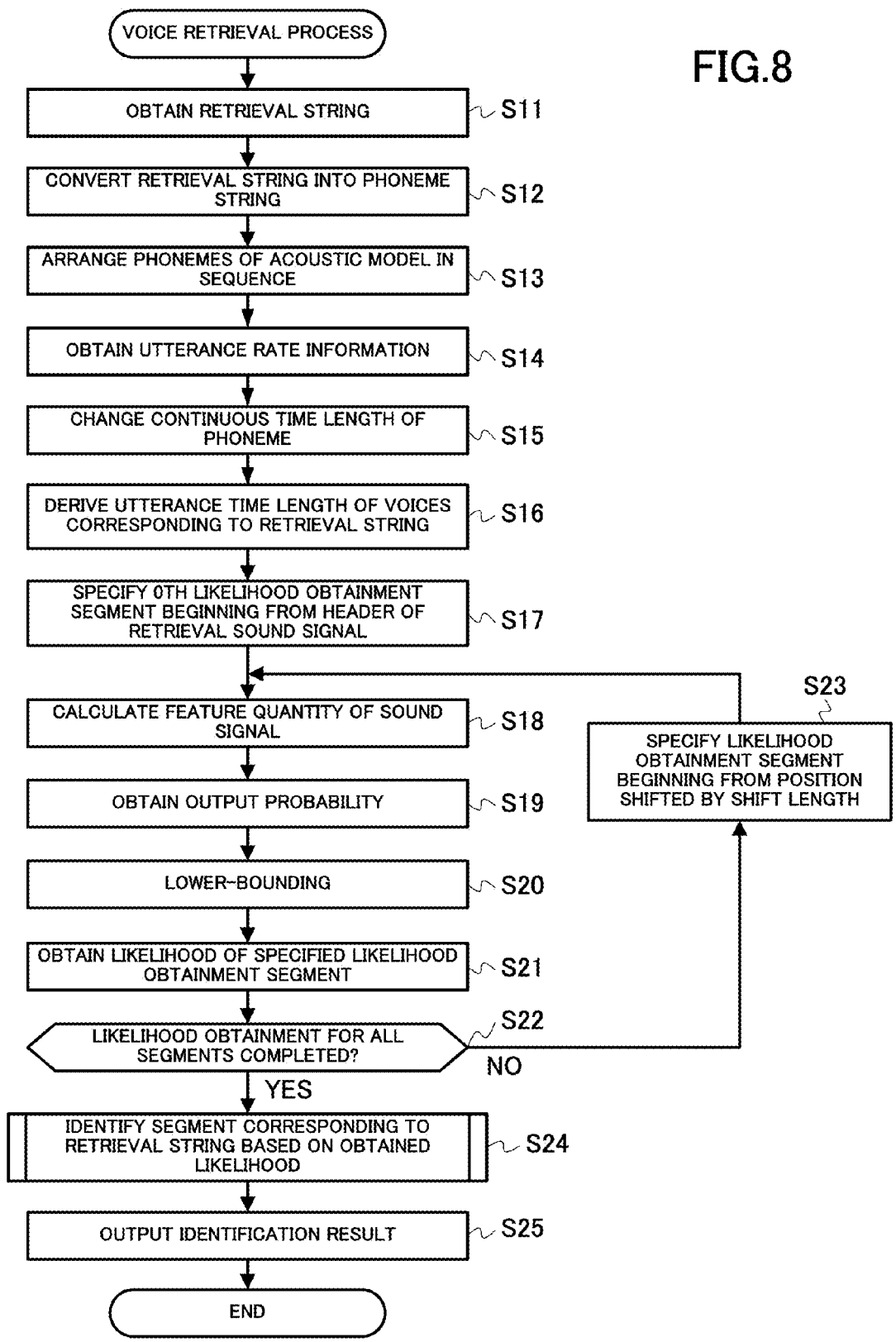
FIG. 8 is a flowchart illustrating a flow of a voice retrieval process executed by the voice retrieval apparatus according to the first embodiment of the present disclosure.

When the CPU 6 reads the voice retrieval program from the ROM 1, and executes this program, the flowchart of FIG. 8 starts. The user inputs the retrieval string "category" subjected to retrieval as text data from the input device 4, and the retrieval string obtainer 111 obtains the retrieval string (step S11). When the retrieval string obtainer 111 obtains the retrieval string, the converter 112 and the second converter 124 convert the retrieval string into the respective phoneme strings (step S12), and arrange the phonemes of the respective acoustic models in sequence in the order of the phoneme in the phoneme string (step S13). More specifically, the converter 112 converts the retrieval string into a mono-phone phoneme string "k, a, t, e, g, o, r, i" based on the mono-phone model, while the second converter 124 converts the retrieval string into tri-phone phoneme strings "k–a+t", "a–t+e", "t–e+g", "e–g+o", "g–o+r", and "o–r+i" based on the tri-phone model. In this case, bi-phone models "k+a" and "r–i" may be added.

The utterance rate information obtainer 114 obtains the utterance rate information in accordance with the utterance rate of the sound signal that is input by the user (step S14). Since the query "category" subjected to retrieval is to be retrieved from the sound signal with substantially 1.4 times slower utterance rate than the utterance rate of the sound data that is the source of a continuous time length to be created, the user inputs, as the utterance rate information, the increase rate shown in FIG. 4 that increases the continuous time length to be 1.4 times. That is, the change rate that is 1.6 times for vowel, and the change rate that is 1.1 times for consonant are respectively input, thereby increasing the average continuous time length to be substantially 1.4 times.

The time length changer 115 changes the average continuous time length obtained from the time length memory 104 via the time length obtainer 113 in accordance with the utterance rate information (step S15). More specifically, the time length changer 115 multiplies the continuous time length for an average utterance rate shown in the second row of FIG. 5 by the increase rate (change rate) shown in FIG. 4, thereby creating a continuous time length shown in the third row of FIG. 5 as the continuous time length for the utterance rate that is 1.4 times slower.

Returning to FIG. 8, when the converter 112 converts the retrieval string into the phoneme string, the time length deriver 116 derives the utterance time length of voices corresponding to the retrieval string (step S16). More specifically, the time length deriver 116 obtains the continuous time length having undergone a time-length change by the time length changer 115, and adds the obtained continuous time lengths, thereby deriving the utterance time length of voices corresponding to the retrieval string. More specifically, in order to create the utterance time length corresponding to the slower utterance rate, a total value (852 ms) obtained by adding the increased continuous time lengths shown in the third row of FIG. 5 is derived as the utterance time length.

When the time length deriver 116 derives the utterance time length, the segment specifier 117 specifies, from the header to the last of the retrieval sound signal, the likelihood obtainment segment that is the segment corresponding to the derived utterance time length by shifting such segment in sequence by the shift length S, and transitions to a process of obtaining the likelihood. First, the segment specifier 117 specifies the 0th frame string that begins from the header of the retrieval sound signal, and specifies the segments (from 0 ms to 852 ms) by what corresponds to the 24 frames in the 0th frame string as the 0th likelihood obtainment segment for the utterance rate that is 1.4 times slower than the average utterance rate (step S17).

When the segment specifier 117 specifies the likelihood obtainment segment, the feature quantity calculator 118 calculates, for each frame, the feature quantity of the sound signal in the specified likelihood obtainment segment (step S18). Next, the output probability obtainer 119 obtains, for each frame, the output probability that the feature quantity is output from each phoneme contained in this phoneme string based on the feature quantity calculated by the feature quantity calculator 118 and the mono-phone model corresponding thereto (step S19). That is, the output probability is obtained for each of the 24 states from "k1" to "i3" in FIG. 5.

When the output probability obtainer 119 obtains the output probabilities, the replacer 120 replaces the output probability obtained for each frame with the maximum output probability in a total of (1+N1+N2) frames that are the frame, the N1 number of frames previous to this frame, and the N2 number of frames subsequent to this frame, thereby executing the Lower-Bounding process (step S20). Hence, an error between the utterance time length derived by the time length deriver 116 and the actual utterance time length of the sound signal is reduced.

The likelihood obtainer 121 takes a logarithm of each output probability having undergone the Lower-Bounding for each frame, and adds the taken logarithms, thereby obtaining the likelihood of the likelihood obtainment segment specified by the segment specifier 117 (step S21). When the likelihood obtainer 121 obtains the likelihood, the repeater 122 determines whether or not likelihood obtainment from all segments in the retrieval sound signal has completed (step S22).

When the likelihood obtainment from all segments has not completed yet (step S22: NO), the segment specifier 117 specifies the likelihood obtainment segment that begins from the position shifted by the shift length S (=10 ms) from the frame specified previously specified (step S23), and the voice retrieval process returns to the step S18. Next, the repeater 122 controls the respective components so as to repeat the processes in the steps S18 to S22 on the likelihood obtainment segment newly specified by the segment specifier 117, and to obtain the likelihood. More specifically, the segment specifier 117 specifies the first frame string from the position shifted by the shift length S (=10 ms) from the header of the sound signal, and specifies this segment as the first likelihood obtainment segment. The feature quantity calculator 118 calculates, for each frame in the first frame string, the feature quantity. The output probability obtainer 119 obtains, for each frame in the first frame string, the output probability, and the replacer 120 performs the Lower-Bounding process. In addition, the likelihood obtainer 121 takes the logarithm of each output probability of each frame in the first frame string, and adds the taken logarithms by what corresponds to the total of 24 frames, thereby obtaining the likelihood of the first likelihood obtainment segment.

As explained above, the repeater 122 controls the segment specifier 117, the feature quantity calculator 118, the output probability obtainer 119, the replacer 120, and the likelihood obtainer 121 so as to shift the likelihood obtainment segment by the shift length up to the last of the retrieval sound signal, and to obtain the likelihood in sequence.

Figure 9:
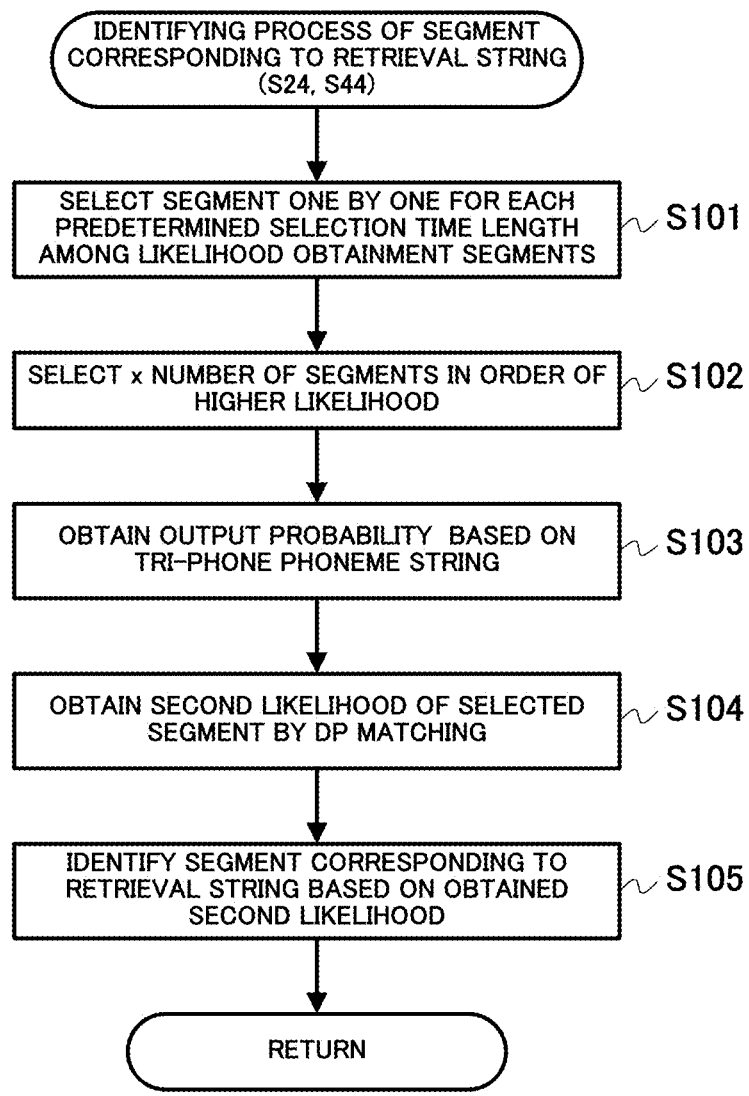
FIG. 9 is a flowchart illustrating a flow of process of identifying a segment corresponding to a retrieval string.

Eventually, when the likelihood obtainment from all segments completes (step S22; YES), the voice retrieval process transitions to a process of identifying the segment corresponding to the retrieval string based on the obtained likelihood (step S24). The details of this identifying process will be explained with reference to the flowchart of FIG. 9.

With the likelihood obtaining process being completed, the selector 123 selects, one by one, the segment for each predetermined selection time length among the likelihood obtainment segments specified by the segment specifier 117 (step S101). The utterance time length of the Japanese term "category" is assumed as being equal to or longer than 2 seconds (L≥2), and the selection time length is set to be 1 second that is the half (m=2) of the assumed time length. Hence, the selector 123 selects the likelihood obtainment segment with the highest likelihood for each selection time length that is 1 second.

In addition, the selector 123 selects the x number of segments in the order of higher likelihood among the selected segments in this way (step S102). That is, the selector 123 preliminary selects the candidate segments to be identified as the final retrieval result in such a way that candidates are selected across the whole retrieval sound signal.

After the preliminary selection by the selector 123, the second output probability obtainer 125 obtains, for each frame based on the tri-phone phoneme string, the output probability in each of the x number of segments selected by the selector 123 (step S103). Next, the second likelihood obtainer 126 obtains the likelihood of the segment selected by the selector 123 by DP matching (step S104). That is, the second output probability obtainer 125 and the second likelihood obtainer 126 execute a likelihood obtaining process with a higher precision than that of the output probability obtainer 119 and the likelihood obtainer 121 based on the tri-phone model and the DP matching.

When the second likelihood obtainer 126 obtains the second likelihood, the identifier 127 identifies the segment corresponding to the retrieval string based on the obtained second likelihood (step S105). For example, the identifier 127 identifies, as the segments where the utterance of voices corresponding to the retrieval string are estimated, the predetermined number of segments in the order of larger second likelihood obtained by the second likelihood obtainer 126. When the process in the step S105 ends, the process in the flowchart of FIG. 9 transitions to step S25 in the flowchart of FIG. 8.

Returning to the flowchart of FIG. 8, after identifying the segment corresponding to the retrieval string, the identifier 127 outputs an identification result via the output device 5 (step S25). Through the above processes, the voice retrieval process executed by the voice retrieval apparatus 100 completes.

As explained above, the voice retrieval apparatus 100 of the first embodiment changes the average phoneme continuous time length to the continuous time length corresponding to the utterance rate based on the utterance rate information corresponding to the utterance rate of the retrieval sound signal. Next, the segment where the utterance of voices corresponding to the query is estimated is identified from the retrieval sound signal based on the continuous time length corresponding to the utterance rate. This process enables the voice retrieval apparatus 100 to accurately identify a voice segment corresponding to the query from the retrieval sound signal although the utterance rate of the retrieval sound signal subjected is different.

The above explanation was given of an example case in which the change rate for the continuous time length is adjusted for each vowel and for each consonant, but as illustrated in FIG. 10, the change rate for consonant may be set to a fixed value that is 1, and only the continuous time length of vowel may be changed as needed.

In addition, the above explanation was given of an example case in which the change rate is set for vowel and consonant, respectively, but a ratio of change rate between vowel and consonant may be set in the voice retrieval program beforehand, and the change rate for vowel and the change rate for consonant may be automatically determined when a certain change rate is input.

In the first embodiment, the explanation was given of an example case in which the segment specifier 117 shifts the header position of the frame string by the shift length S, and repeats the processes of calculating the feature quantity, obtaining the output probability, and obtaining the likelihood by P times for every shifting. However, after the segment specifier 117 initially specifies frames from the 0th frame to the (P−1)th frame, and specifies the likelihood obtainment segments from the 0th likelihood obtainment segment to the (P−1)th likelihood obtainment segment, the feature quantity may be calculated and the output probability and the likelihood may be obtained.

In addition, when a bi-phone model is also applied, after the preliminary selection based on the mono-phone model is performed, a secondary selection may be performed based on the bi-phone model, and then a third selection (final selection) based on the tri-phone model may be performed. In addition, in the preliminary selection based on the mono-phone model, a primary selection may be performed based on a combination of the mono-phone model and the bi-phone model, or a secondary selection (final selection) may be performed based on a combination of the bi-phone model and the tri-phone model.

Second Embodiment

In the first embodiment, the explanation was given of an example case in which the utterance rate is assumed as constant, and only a piece of utterance rate information is set. Accordingly, the embodiment was carried out with the utterance rate information that is only one type. In actual speeches, however, the same term is not always uttered at the same utterance rate. For example, as for the term "category", such a term may be uttered at an average utterance rate, and may be uttered slowly so as to emphasize the term. In order to cope with such circumstances, in the second embodiment, multiple utterance time lengths are derived based on multiple pieces of utterance rate information. In the second embodiment, an explanation will be given of an example case in which three types of utterance rate information (change rate for continuous time length) that are 0.7 (fast), 1.0 (normal), and 1.4 (slow) are applied.

A voice retrieval apparatus according to the second embodiment employs the same physical structure as that of the voice retrieval apparatus 100 of the first embodiment illustrated in FIG. 1. In addition, the functional structure is also the same as the structure illustrated in FIG. 2.

A voice retrieval process executed by the voice retrieval apparatus 100 of the second embodiment will be explained with reference to the flowchart of FIG. 11.

The retrieval sound signal is recorded sound of a 1-hour lecture meeting, and is stored in the sound signal memory 101 beforehand. In this case, the example retrieval string is "category". The utterance rate information that is the change rate illustrated in FIG. 4 is prepared beforehand.

Figure 11:
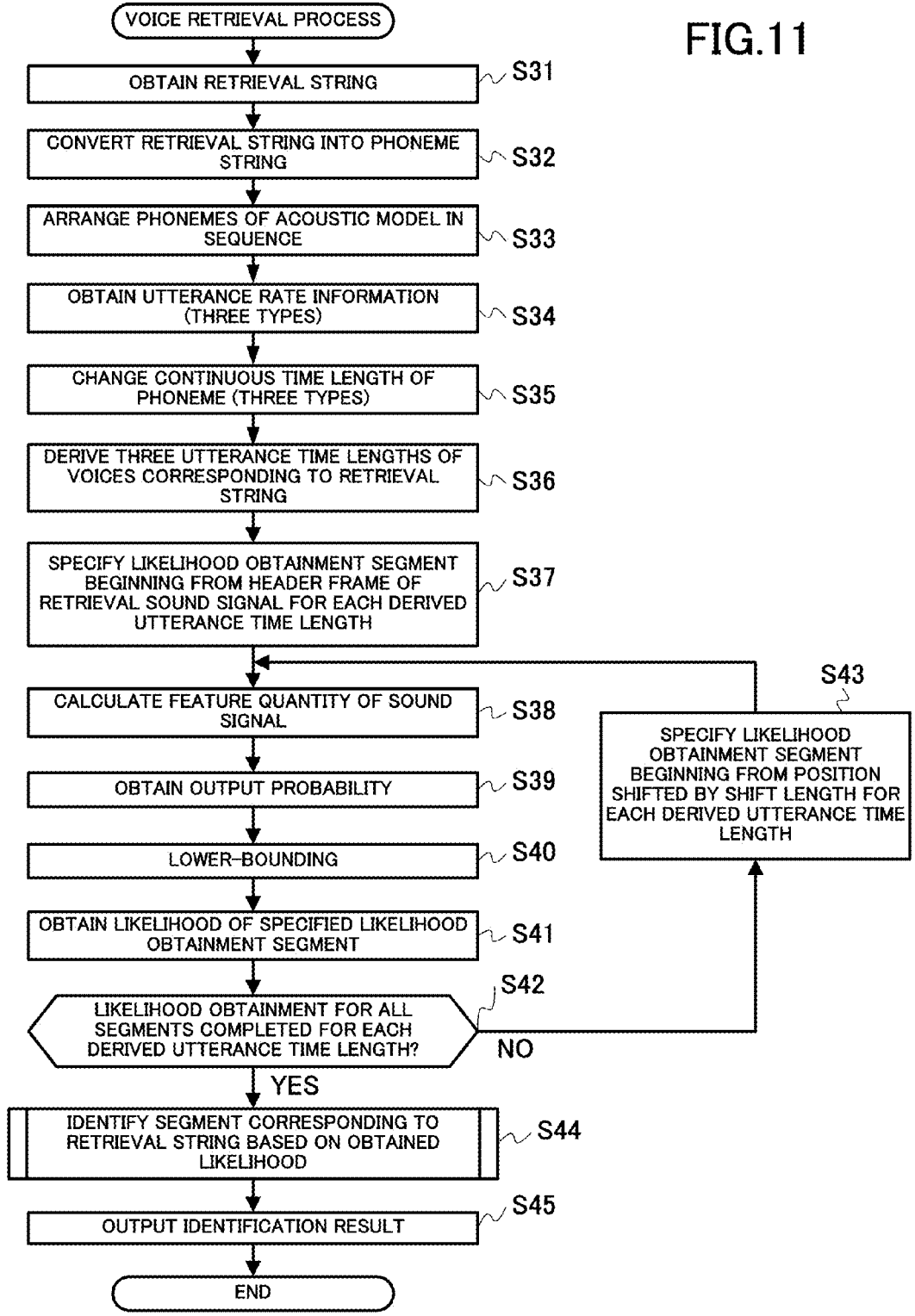
FIG. 11 is a flowchart illustrating a flow of a voice retrieval process executed by a voice retrieval apparatus according to a second embodiment of the present disclosure.

When the CPU 6 reads the voice retrieval program from the ROM 1, and executes this program, the flowchart of FIG. 11 starts. The user inputs the retrieval string "category" subjected to retrieval as text data from the input device 4, and the retrieval string obtainer 111 obtains the retrieval string (step S31). When the retrieval string obtainer 111 obtains the retrieval string, the converter 112 and the second converter 124 convert the retrieval string into the phoneme string (step S32), and arrange the phonemes of the respective acoustic models in sequence in the order of the phoneme in the phoneme string (step S33). More specifically, the converter 112 converts the retrieval string into a mono-phone phoneme string based on the mono-phone model, while the second converter 124 converts the retrieval string into tri-phone phoneme strings based on the tri-phone model.

The utterance rate information obtainer 114 obtains the three types of utterance rate information that are 0.7 (fast), 1.0 (normal), and 1.4 (slow) provided by the user (step S34). More specifically, the utterance rate information obtainer 114 obtains the change rate (increase rate and decrease rate) shown in FIG. 4. As for the change rate corresponding to a "normal" utterance rate, since the change rate for both vowel and consonant is 1.0, the illustration is omitted.

The time length changer 115 creates three types of continuous time length corresponding to the three types of utterance rate information based on the average continuous time length of respective phoneme states obtained from the time length memory 104 (step S35).

More specifically, as the time length corresponding to the 24 states of the phoneme string "k, a, t, e, g, o, r, i", the average continuous time length obtained from the time length memory 104 via the time length obtainer 113 is obtained as the continuous time length corresponding to the "normal" utterance rate. The time length changer 115 multiplies the obtained continuous time length by 1.0, and sets the multiplication result as the continuous time length corresponding to the "normal" utterance rate. This is shown in the second row of FIG. 5. The time length changer 115 multiplies, as the continuous time length corresponding to the "slow" utterance rate, the average continuous time length shown in the second row of FIG. 5 by the increase rate shown in FIG. 4, and creates the continuous time length for the "slow" utterance rate which is the value shown in the third row of FIG. 5. The time length changer 115 multiplies, as the continuous time length corresponding to the "fast" utterance rate, the average continuous time length shown in the second row of FIG. 5 by the decrease rate illustrated in FIG. 4, and creates the continuous time length for the "fast" utterance rate which is the value shown in the fourth row of FIG. 5.

Next, when the converter 112 converts the retrieval string into the phoneme string, the time length deriver 116 derives three time lengths as the utterance time lengths of voices corresponding to the retrieval string (step S36). More specifically, a value (620 ms) obtained by totalizing the 24 continuous time lengths shown in the second row of FIG. 5 is derived as the utterance time length corresponding to the "normal" utterance rate. A value (852 ms) obtained by totalizing the 24 continuous time lengths shown in the third row of FIG. 5 is derived as the utterance time length corresponding to the "slow" utterance rate. A value (456 ms) obtained by totalizing the 24 continuous time lengths shown in the fourth row of FIG. 5 is derived as the utterance time length corresponding to the "fast" utterance rate.

Returning to FIG. 11, when the time length deriver 116 derives the three time lengths as the utterance time lengths, the voice retrieval process specifies the likelihood obtainment segment in sequence which is the segment of each derived time length from the header of the sound signal subjected to retrieval to the last, and transitions to the process of obtaining the likelihood.

First, the segment specifier 117 specifies, for each of three time lengths derived by the time length deriver 116, the 0th frame string that starts from the header of the sound signal subjected to retrieval, and specifies the segment by what corresponds to the 24 frames as the 0th likelihood obtainment segment (step S37). More specifically, the 0th frame string is specified based on the continuous time length for the "normal" utterance rate, and the segment (0 ms to 620 ms) by what corresponds to the 24 frames is specified as the 0th likelihood obtainment segment for the "normal" utterance rate. The 0th frame string is specified based on the continuous time length for the "slow" utterance rate, and the segment (0 ms to 852 ms) by what corresponds to the 24 frames from the header of the sound signal is specified as the 0th likelihood obtainment segment for the "slow" utterance rate. Likewise, the segment (0 ms to 456 ms) from the header of the sound signal is specified as the 0th likelihood obtainment segment for the "fast" utterance rate.

When the segment specifier 117 specifies the likelihood obtainment segment for each time length (620 ms, 852 ms, 456 ms), the feature quantity calculator 118 calculates, for each frame, the feature quantity of the sound signal in the specified likelihood obtainment segment (step S38). More specifically, first, the likelihood obtainment segment (620 ms) corresponding to the "normal" utterance rate is taken out from the sound signal, and for each frame length in each phoneme state illustrated in the second row of FIG. 5 corresponding to the "normal" utterance rate, the feature quantity of the sound signal is calculated by 24 frames. Next, the likelihood obtainment segment (852 ms) corresponding to the "slow" utterance rate is taken out from the sound signal, and for each frame length in each phoneme state illustrated in the third row of FIG. 5 corresponding to the "slow" utterance rate, the feature quantity of the sound signal is calculated by 24 frames. Subsequently, the likelihood obtainment segment (456 ms) corresponding to the "fast" utterance rate is taken out from the sound signal, and for each frame length in each phoneme state illustrated in the fourth row of FIG. 5 corresponding to the "fast" utterance rate, the feature quantity of the sound signal is calculated by 24 frames.

Next, the output probability obtainer 119 obtains, based on the feature quantity calculated by the feature quantity calculator 118 and the corresponding mono-phone model, the output probability that the feature quantity is output from each phoneme contained in the phoneme string for each frame (step S39). In this case, the output probabilities by what corresponds to "three types of utterance rate×P number of likelihood obtainment segments×24 frames" are obtained.

When the output probability obtainer 119 obtains the output probability, the replacer 120 replaces the output probability obtained for each frame with the maximum output probability in the adjacent several frames (previous two frames, the frame, subsequent two frames), thereby performing Lower-Bounding (step S40). Hence, the error between the utterance time length derived by the time deriver 116 and the actual utterance time length is reduced.

The likelihood calculator 121 takes a logarithm of each output probability having undergone Lower-Bounding for each frame, and adds the obtained logarithms, thereby obtaining the likelihood of the likelihood obtainment segment specified by the segment specifier 117 for each of the three utterance rates (step S41). When the likelihood obtainer 121 obtains the likelihood, the repeater 122 determines whether or not, for each time length of the utterance time length derived by the time length deriver 116, likelihood obtainment for all segments in the retrieval sound signal has completed (step S42).

When likelihood obtainment for all segments has not completed yet (step S42; NO), for each of the three time lengths derived by the time length deriver 116 as the utterance time lengths, the segment specifier 117 specifies the likelihood obtainment segment that begins from a frame shifted by the shift length S (=10 ms) from the frame specified previously (step S43), and the voice retrieval process returns to the step S38. More specifically, the first frame string for the "normal" utterance rate is specified at the position shifted by 10 ms from the header of the sound signal, and the segment (from 10 ms to 630 ms) of this frame string is specified as the first likelihood obtainment segment for the "normal" utterance rate. Likewise, the first frame string for the "slow" utterance rate is specified, and the segment (from 10 ms to 862 ms) of this frame string is specified as the first likelihood obtainment segment for the "slow" utterance rate. Likewise, the first frame string for the "fast" utterance rate is specified, and the segment (from 10 ms to 466 ms) is specified as the first likelihood obtainment segment for the "first" utterance rate.

Next, the repeater 122 controls the respective components so as to repeat the processes in the steps S38 to S42 on the likelihood obtainment segment newly specified for each time length, and to obtain the likelihood. In this manner, the repeater 122 controls the respective components so as to shift the likelihood obtainment segment specified by the segment specifier 117 by the shift length S (=10 ms) up to the last of the retrieval sound signal, and to obtain the likelihood in sequence.

Eventually, when likelihood obtainment for each P number of segments corresponding to each of the three types of utterance rate completes (step S42; YES), the voice retrieval process transitions to a process of identifying the segment corresponding to the retrieval string based on the obtained likelihood (step S44). This identifying process is the same as the process explained with reference to the flowchart of FIG. 9.

That is, the selector 123 selects, for each predetermined selection time length (1 second), the segment one by one among the likelihood obtainment segments corresponding to the three types of utterance rate (that is, P number of segments for each type) and specified by the segment specifier 117 (step S101). In the selection time length, the likelihood obtainment segments corresponding to the three types of utterance rate are included, and the likelihood obtainment segment with the highest likelihood is selected. Hence, the selector 121 may select, in accordance with the utterance rate of the sound signal for the 1-hour lecture meeting, the likelihood obtainment segment corresponding to the "fast" utterance rate, or may select the likelihood obtainment segment corresponding to the "slow" utterance rate.

In addition, the selector 123 selects the x number of segments among the selected segments in the order of higher likelihood (step S102).

The second output probability obtainer 125 obtains, for each frame, the output probability in the segment selected by the selector 123 based on the tri-phone phoneme string (step S103). The second likelihood calculator 126 obtains the likelihood of the segment selected by the selector 123 by DP matching (step S104). Next, the identifier 127 identifies the segment where the utterance of voices corresponding to the retrieval string is estimated based on the obtained second likelihood (step S105).

When the segment corresponding to the retrieval string is identified, the identifier 127 outputs an identification result via the output device 5 (step S45). Through the above processes, the voice retrieval process executed by the voice retrieval apparatus 100 ends.

As explained above, the voice retrieval apparatus 100 of the second embodiment sets the three types of utterance rate information as the utterance time length of voices corresponding to the retrieval string, thereby deriving three time lengths corresponding to the utterance rate as the utterance time lengths. Next, the voice retrieval apparatus 100 specifies the segment of the time length corresponding to each of three derived time lengths as the likelihood obtainment segment, and identifies the segment where the utterance of voices corresponding to the retrieval string is estimated among the specified likelihood obtainment segments. Consequently, a possibility that, due to the utterance rate difference, the likelihood is deteriorated and is excluded from the candidate is reduced, and thus the retrieval precision is improved even in the case of voice retrieval for the sound signal that has a different utterance rate from the average utterance rate.

The voice retrieval apparatus 100 of the second embodiment derives, for the preliminary selection, the multiple utterance time lengths based on the multiple continuous time lengths by setting the multiple pieces of utterance rate information. Hence, the process load of preliminary selection increases. However, since the process of preliminary selection is to calculate the likelihood with respect to the mono-phone model, in comparison with the process of identifying the final segment by calculating the likelihood based on the tri-phone model that has a large amount of information, the calculation process load is little. Therefore, although the three types of utterance rate information are set as explained above in this embodiment, an increase in retrieval process time relative to the whole process is little.

As explained above, the voice retrieval apparatus 100 of this embodiment derives a large number of utterance rate time lengths corresponding to the different utterance rates in the preliminary selection, and retrieves the candidate segments. Hence, a high retrieval precision is ensured for the sound signal that changes the utterance rate in midstream. In addition, by limiting the number of candidate segments in the preliminary selection, the process based on the tri-phone model with a large amount of information and having a heavy calculation process load is reduced although the precision is still excellent. Consequently, the voice retrieval apparatus 100 is capable of performing highly precise voice retrieval while suppressing a calculation amount.

In the second embodiment, the explanation was given of an example case in which after the continuous time length is increased or decreased based on the utterance rate information, the continuous time length having undergone the change is added in a manner corresponding to the mono-phone phoneme string, and the multiple utterance time lengths are derived. However, in order to set the uniform change rate for the continuous time length for vowel and for consonant, an utterance time length may be obtained from the average continuous time lengths stored in the time length memory 104, and this utterance time length may be changed based on the utterance rate information that is 1.4 times or 0.7 times.

In addition, in the second embodiment, the explanation was given of an example case in which the three types of utterance rate information are input, but the number of utterance rate information is not limited to such a specific number. The three types of utterance rate information may be set up in the voice retrieval program beforehand, and three types of continuous time length may be automatically created.

Still further, in the second embodiment, the explanation was given of an example case in which only the continuous time length is changed in accordance with the utterance rate. However, the acoustic models should be desirably classified in accordance with the utterance rate, and should be desirably selected and applied in accordance with the utterance rate.

First Modified Example

The explanation was given of an example case in which the voice retrieval apparatus 100 of the first and second embodiments uniformly multiplies the continuous time length of each phoneme state by the change rate. However, the present invention is not limited to this case. An explanation will be given of an example case in which the change rate is changed for each phoneme state.

The example case in which the change rate is changed for each phoneme state will be explained with reference to FIG. 12. A change rate to a continuous time length T1 of a phoneme first state is defined as a1, a change rate to a continuous time length T2 of a phoneme second state is defined as a2, and change rate to a continuous time length T3 of a phoneme third state is defined as a3.

In this modified example, when the continuous time length is to be increased, as for vowel, the change rate for the first state is set to be 1.3, the change rate for the second state is set to be 1.6, and the change rate for the third state is set to be 1.3. As for consonant, the change rate for the first state is set to be 1.1, the change rate for the second state is set to be 1.2, and the change rate for the third state is set to be 1.1. Conversely, when the continuous time length is to be decreased, as for vowel, the change rate for the first state is set to be 0.8, the change rate for the second state is set to be 0.6, and the change rate for the third state is set to be 0.8. As for consonant, the change rate for the first state is set to be 0.9, the change rate for the second state is set to be 0.8, and the change rate for the third state is set to be 0.9.

In normal conversations, the center state of phoneme (second state in FIG. 12) tends to have a large change in continuous time length relative to a change in utterance rate rather than the both-end states of phoneme (first state and third state in FIG. 12). Based on such a tendency, in the example case illustrated in FIG. 12, the change rate α2 of the second state is set to be larger than the change rates α1, α3 of the first and third states.

In addition, in the case of singing, the third state may sometimes have a larger change depending on the speed of singing than the first state in FIG. 12. In such a case, the change rate α3 of the third state is set to be larger than the change rate α1 of the first state.

As explained above, by setting the change rate for each phoneme state, the ratio of the continuous time length for each phoneme state can be approximated to the actual continuous time length in accordance with the utterance rate. This enables the voice retrieval apparatus 100 to perform a further accurate voice retrieval.

In the first modified example, although the explanation was given of an example case in which, with reference to FIG. 12, the change rate is set for each phoneme state, the change rate for each state may be set up in the voice retrieval program beforehand, and the multiple continuous time lengths may be automatically created from a continuous time length.

In addition, in the first modified example, the continuous time lengths for the first, second, and third states, respectively, are changed. However, the continuous time lengths for only two states or the continuous time length for only one state may be changed. For example, only the continuous time length of a state (second state) that does not contain the start of utterance or the end of utterance may be changed without the continuous time length of a state (first and third states) that contains the start of utterance or the end of utterance being changed. FIG. 13 illustrates an example case in which the change rate for the first and third states may be set to 1, while the change rate for the second state is set so as to change only the continuous time length of the second state.

In addition, in the above first and second embodiments, the explanation was given of an example case in which the x number of likelihood obtainment segments are selected in the order of higher likelihood. However, the way of selecting the likelihood obtainment segments is not limited to this case. For example, a specific likelihood value may be set as a threshold, and the likelihood obtainment segment with a value equal to or larger than the threshold may be selected.

In an application that does not require a highly precise retrieval, the Lower-Bounding process may be omitted. In an application that requires a highly precise retrieval, when retrieval is performed like the second embodiment based on the continuous time lengths corresponding to various types of utterance rate, the Lower-Bounding process may be omitted in some cases.

In the foregoing embodiments, the explanation was given of an example case in which a retrieval term is input from the input device 4 as text data, but a retrieval term may be input from the microphone of a voice recognition device as voice data, and the voice recognition device may recognize the input retrieval term.

In addition, in the foregoing embodiments, the explanation was given of an example case in which the utterance rate information (change rate for continuous time length) is input from the input device 4. However, a part of sound signal may be analyzed, the utterance rate may be estimated based on pitch information contained in voices per a unit time, and the change rate to the continuous time length may be determined based on such estimation.

Moreover, the time length memory 104 may be provided in an external server device, and the time length obtainer 113 may obtain, via a communication line from the server device, the average continuous time length for each phoneme state corresponding to the phoneme string created by the changer 112.

Still further, although the voice retrieval apparatus employing the structure to accomplish the functions of the present disclosure beforehand can be provided, by applying a program, conventional personal computer, information terminal device, and the like may be caused to function as the voice retrieval apparatus of the present disclosure. That is, conventional personal computer, information terminal device, and the like can be made to function as a voice retrieval apparatus of the present disclosure by applying a program for realizing the respective functional structures of the voice retrieval apparatus 100 exemplified in the foregoing embodiments to such devices in a manner executable by a CPU, and the like which control such devices. Moreover, a voice retrieval method according to the present disclosure can be carried out by the voice retrieval apparatus.

How to apply such a program is optional. For example, in order to apply the program, the program may be stored in a non-transitory computer-readable recording medium (for example, a Compact Disc Read-Only Memory (CD-ROM), a Digital Versatile Disc (DVD), a Magneto Optical disc (MO), and the like), or may be stored in a storage over a network like the Internet, and may be downloaded to apply the program.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A voice retrieval apparatus comprising:
   a processor;
   a memory that records a sound signal subjected to retrieval; and
   an output device comprising a screen,
   wherein the processor executes following processes:
      a time length obtaining process of obtaining, from a database that stores continuous time length data on a phoneme, a continuous time length for each phoneme contained in a phoneme string of a retrieval string;
      an utterance rate information obtaining process of obtaining information on an utterance rate;
      a time length changing process of changing the continuous time length for each of the phonemes obtained in the time length obtaining process in accordance with the information on the utterance rate obtained in the utterance rate information obtaining process;
      a time length deriving process of deriving, based on the continuous time length for each of the phonemes changed in the time length changing process, an utterance time length of voices corresponding to the retrieval string;
      a segment specifying process of specifying, as likelihood obtainment segments, a plurality of segments of the utterance time length derived in the time length deriving process in the sound signal subjected to retrieval;
a likelihood obtaining process of obtaining a likelihood showing a plausibility that the likelihood obtainment segment specified in the segment specifying process is a segment where voices corresponding to the retrieval string are uttered;
an identifying process of identifying, based on the likelihood obtained in the likelihood obtainment process, an estimation segment where, within the sound signal subjected to retrieval, utterance of voices corresponding the retrieval string is estimated, the estimation segment being identified for each of the likelihood obtainment segments specified in the segment specifying process; and
a displaying process of displaying on the screen of the output device, the estimation segment identified in the identifying process,
wherein in the time length changing process, a continuous time length for each vowel phoneme and a continuous time length for each consonant phoneme in the continuous time length for each of the phonemes obtained in the time length obtaining process are changed at respective change rates.

2. The voice retrieval apparatus according to claim 1, wherein in the time length changing process, the continuous time length for each vowel phoneme in the continuous time length for each of the phonemes obtained in the time length obtaining process is changed at a larger change rate than a change rate for the continuous time length for each consonant phoneme.

3. The voice retrieval apparatus according to claim 1, wherein:
in the time length obtaining process, the continuous time length for each of the phonemes contained in the phoneme string is obtained for each phoneme state; and
in the time length changing process, the continuous time length obtained for each of the phoneme states in the time length obtaining process is changed at a change rate defined for each of the phoneme states.

4. The voice retrieval apparatus according to claim 3, wherein in the time length changing process, the continuous time length of a state that includes a start of phoneme utterance or an end of phoneme utterance in each of the phoneme states is changed at a smaller change rate than a change rate for the continuous time length of a state that does not include the start of phoneme utterance or the end of phoneme utterance.

5. The voice retrieval apparatus according to claim 1, wherein:
the processor further executes:
a feature quantity calculating process of calculating a feature quantity of the sound signal subjected to retrieval in the likelihood obtainment segment specified in the segment specifying process for each frame that is a time window to compare the sound signal with an acoustic model; and
an output probability obtaining process of obtaining, for each of the frames, an output probability that the feature quantity of the sound signal subjected to retrieval is output from each phoneme contained in the phoneme string, and
in the likelihood obtaining process, respective values that are each a logarithm of the output probability obtained for each of the frames contained in the likelihood obtainment segment specified in the segment specifying process are added to obtain the likelihood of the likelihood obtainment segment.

6. The voice retrieval apparatus according to claim 5, wherein:
the processor further executes:
a converting process of arranging phonemes of an acoustic model that does not depend on adjacent phonemes to convert the retrieval string into the phoneme string;
a selecting process of selecting, based on the likelihood obtained in the likelihood obtaining process, candidates of the estimation segment from the plurality of specified likelihood obtainment segments;
a second converting process of arranging phonemes of a second acoustic model that depends on adjacent phonemes to convert the retrieval string into a second phoneme string; and
a second likelihood obtaining process of obtaining, for each of the plurality of candidates selected in the selecting process, a second likelihood showing a plausibility that the segment selected as the candidate estimation segment in the selecting process is a segment where voice corresponding to the retrieval string is uttered based on the second phoneme string; and
in the likelihood obtaining process, the likelihood of the likelihood obtainment segment specified in the segment specifying process is obtained based on the phoneme string; and
in the identifying process, the estimation segment is identified among plurality of candidates selected in the selecting process based on the second likelihood obtained in the second likelihood obtaining process.

7. The voice retrieval apparatus according to claim 6, wherein in the selecting process, the plurality of candidates of the estimation segment is selected by selecting, from the likelihood obtainment segments beginning in a predetermined selection time length, the likelihood obtainment segment one by one with a maximum likelihood for each of the predetermined selection time lengths in the likelihood obtainment segments specified in the segment specifying process.

8. A voice retrieval method executed by a voice retrieval apparatus that includes a memory storing a sound signal subjected to retrieval, the method comprising:
a converting step of converting a retrieval string into a phoneme string;
a time length obtaining step of obtaining, from a database that stores continuous time length data on a phoneme, a continuous time length for each phoneme contained in the phoneme string converted in the converting step;
an utterance rate information obtaining step of obtaining information on an utterance rate;
a time length changing step of changing the continuous time length for each of the phonemes obtained in the time length obtaining step in accordance with the information on the utterance rate obtained in the utterance rate information obtaining step;
a time length deriving step of deriving, based on the continuous time length for each of the phonemes changed in the time length changing step, an utterance time length of voices corresponding to the retrieval string;
a segment specifying step of specifying, as likelihood obtainment segments, a plurality of segments of the utterance time length derived in the time length deriving step in the sound signal subjected to retrieval;

a likelihood obtaining step of obtaining a likelihood showing a plausibility that the likelihood obtainment segment specified in the segment specifying step is a segment where voices corresponding to the retrieval string are uttered;

an identifying step of identifying, based on the likelihood obtained in the likelihood obtaining step, an estimation segment where, in the sound signal subjected to retrieval, utterance of voices corresponding the retrieval string is estimated, the estimation segment being identified for each of the likelihood obtainment segments specified in the segment specifying step; and a displaying step of displaying on a screen of an output device, the estimation segment identified in the identifying step, wherein in the time length changing step, a continuous time length for each vowel phoneme and a continuous time length for each consonant phoneme in the continuous time length for each of the phonemes obtained in the time length obtaining step are changed at respective change rates.

9. The voice retrieval method according to claim 8, wherein in the time length changing step, the continuous time length for each vowel phoneme in the continuous time length for each of the phonemes obtained in the time length obtaining step is changed at a larger change rate than a change rate for the continuous time length for each consonant phoneme.

10. The voice retrieval method according to claim 8, wherein:

in the time length obtaining step, the continuous time length for each of the phonemes contained in the phoneme string converted in the converting step is obtained for each phoneme state; and in the time length changing step, the continuous time length obtained for each of the phoneme states in the time length obtaining step is changed at a change rate defined for each phoneme state.

11. The voice retrieval method according to claim 10, wherein in the time length changing step, the continuous time length of a state that includes a start of phoneme utterance or an end of phoneme utterance in each phoneme state is changed at a smaller change rate than a change rate for the continuous time length of a state that does not include the start of phoneme utterance or the end of phoneme utterance.

12. The voice retrieval method according to claim 8, further comprising:

a feature quantity calculating step of calculating a feature quantity of the sound signal subjected to retrieval in the likelihood obtainment segment specified in the segment specifying step for each frame that is a time window to compare the sound signal with an acoustic model; and an output probability obtaining step of obtaining, for each frame, an output probability that the feature quantity of the sound signal subjected to retrieval is output from each phoneme contained in the phoneme string, wherein in the likelihood obtaining step, respective values that are each a logarithm of the output probability obtained for each frame contained in the likelihood obtainment segment specified in the segment specifying step are added to obtain the likelihood of the likelihood obtainment segment.

13. The voice retrieval method according to claim 12, wherein:

in the converting step, phonemes of an acoustic model that does not depend on adjacent phonemes are arranged to convert the retrieval string into the phoneme string;

in the likelihood obtaining step, the likelihood of the likelihood obtainment segment specified in the segment specifying step is obtained based on the phoneme string;

the method further comprises:

a selecting step of selecting, based on the likelihood obtained in the likelihood obtaining step, candidates of the estimation segment from the plurality of specified likelihood obtainment segments;

a second converting step of arranging phonemes of a second acoustic model that depends on adjacent phonemes to convert the retrieval string into a second phoneme string; and a second likelihood obtaining step of obtaining, for each of the plurality of candidates selected in the selecting step, a second likelihood showing a plausibility that the segment selected as the candidate estimation segment in the selecting step is a segment where voices corresponding to the retrieval string are uttered based on the second phoneme string; and in the identifying step, the estimation segment is identified among plurality of candidates selected in the selecting step based on the second likelihood obtained in the second likelihood obtaining step.

14. The voice retrieval method according to claim 13, wherein in the selecting step, the plurality of candidates of the estimation segment is selected by selecting, from the likelihood obtainment segments beginning in a predetermined selection time length, the likelihood obtainment segment one by one with a maximum likelihood for each of the predetermined selection time lengths in the likelihood obtainment segments specified in the segment specifying step.

15. A non-transitory recording medium having recorded therein a program that causes a computer of a voice retrieval apparatus including a memory to record a sound signal subjected to retrieval to execute:

a time length obtaining process of obtaining, from a database that stores continuous time length data on a phoneme, a continuous time length for each phoneme contained in a phoneme string of a retrieval string;

an utterance rate information obtaining process of obtaining information on an utterance rate;

a time length changing process of changing the continuous time length for each of the phonemes obtained in the time length obtaining process in accordance with the information on the utterance rate obtained in the utterance rate information obtaining process;

a time length deriving process of deriving, based on the continuous time length for each of the phonemes changed in the time length changing process, an utterance time length of voices corresponding to the retrieval string;

a segment specifying process of specifying, as likelihood obtainment segments, a plurality of segments of the utterance time length derived in the time length deriving process in the sound signal subjected to retrieval;

a likelihood obtaining process of obtaining a likelihood showing a plausibility that the likelihood obtainment segment specified in the segment specifying process is a segment where voices corresponding to the retrieval string are uttered;

an identifying process of identifying, based on the likelihood obtained in the likelihood obtainment process, an estimation segment where, within the sound signal subjected to retrieval, utterance of voices corresponding the retrieval string is estimated, the estimation segment being identified for each likelihood obtainment segment specified in the segment specifying process; and a displaying process of displaying, on a screen of an output device, the estimation segment identified in the identifying process, wherein in the time length changing process, a continuous time length for each vowel phoneme and a continuous time length for each consonant phoneme in the continuous time length for each of the phonemes obtained in the time length obtaining process are changed at respective change rates.

16. A voice retrieval apparatus comprising:

a processor;

a memory that records a sound signal subjected to retrieval; and an output device comprising a screen, wherein the processor executes following processes:

a time length obtaining process of obtaining, from a database that stores continuous time length data on a phoneme, a continuous time length for each phoneme contained in a phoneme string of a retrieval string;

an utterance rate information obtaining process of obtaining information on an utterance rate;

a time length changing process of changing the continuous time length for the phonemes obtained in the time length obtaining process in accordance with the information on the utterance rate obtained in the utterance rate information obtaining process;

a time length deriving process of deriving, based on the continuous time length for each of the phonemes changed in the time length changing process, an utterance time length of voices corresponding to the retrieval string;

a segment specifying process of specifying, as likelihood obtainment segments, a plurality of segments of the utterance time length derived in the time length deriving process in the sound signal subjected to retrieval;

a likelihood obtaining process of obtaining a likelihood showing a plausibility that the likelihood obtainment segment specified in the segment specifying process is a segment where voices corresponding to the retrieval string are uttered;

an identifying process of identifying, based on the likelihood obtained in the likelihood obtainment process, an estimation segment where, within the sound signal subjected to retrieval, utterance of voices corresponding the retrieval string is estimated, the estimation segment being identified for each of the likelihood obtainment segments specified in the segment specifying process; and a displaying process of displaying on the screen of the output device, the estimation segment identified in the identifying process, wherein in the time length changing process, only a continuous time length for each vowel phoneme in the continuous time lengths for respective vowel and consonant phonemes obtained in the time length obtaining process is changed.

17. A voice retrieval method executed by a voice retrieval apparatus that includes a memory storing a sound signal subjected to retrieval, the method comprising:

a converting step of converting a retrieval string into a phoneme string;

a time length obtaining step of obtaining, from a database that stores continuous time length data on a phoneme, a continuous time length for each phoneme contained in the phoneme string converted in the converting step;

an utterance rate information obtaining step of obtaining information on an utterance rate;

a time length changing step of changing the continuous time length for the phonemes obtained in the time length obtaining step in accordance with the information on the utterance rate obtained in the utterance rate information obtaining step;

a time length deriving step of deriving, based on the continuous time length for each of the phonemes changed in the time length changing step, an utterance time length of voices corresponding to the retrieval string;

a segment specifying step of specifying, as likelihood obtainment segments, a plurality of segments of the utterance time length derived in the time length deriving step in the sound signal subjected to retrieval;

a likelihood obtaining step of obtaining a likelihood showing a plausibility that the likelihood obtainment segment specified in the segment specifying step is a segment where voices corresponding to the retrieval string are uttered;

an identifying step of identifying, based on the likelihood obtained in the likelihood obtainment step, an estimation segment where, in the sound signal subjected to retrieval, utterance of voices corresponding the retrieval string is estimated, the estimation segment being identified for each of the likelihood obtainment segments specified in the segment specifying step; and a displaying step of displaying on a screen of an output device, the estimation segment identified in the identifying step, wherein in the time length changing step, only a continuous time length for each vowel phoneme in the continuous time lengths for respective vowel and consonant phonemes obtained in the time length obtaining step is changed.

18. A non-transitory recording medium having recorded therein a program that causes a computer of a voice retrieval apparatus including a memory to record a sound signal subjected to retrieval to execute:

a time length obtaining process of obtaining, from a database that stores continuous time length data on a phoneme, a continuous time length for each phoneme contained in a phoneme string of a retrieval string;

an utterance rate information obtaining process of obtaining information on an utterance rate;

a time length changing process of changing the continuous time length for the phonemes obtained in the time length obtaining process in accordance with the information on the utterance rate obtained in the utterance rate information obtaining process;

a time length deriving process of deriving, based on the continuous time length for each of the phonemes changed in the time length changing process, an utterance time length of voices corresponding to the retrieval string;

a segment specifying process of specifying, as likelihood obtainment segments, a plurality of segments of the utterance time length derived in the time length deriving process in the sound signal subjected to retrieval;

a likelihood obtaining process of obtaining a likelihood showing a plausibility that the likelihood obtainment segment specified in the segment specifying process is a segment where voices corresponding to the retrieval string are uttered;

an identifying process of identifying, based on the likelihood obtained in the likelihood obtainment process, an estimation segment where, within the sound signal subjected to retrieval, utterance of voices corresponding the retrieval string is estimated, the estimation segment being identified for each likelihood obtainment segment specified in the segment specifying process; and a displaying process of displaying, on a screen of an output device, the estimation segment identified in the identifying process, wherein in the time length changing process, only a continuous time length for each vowel phoneme in the continuous time lengths for respective vowel and consonant phonemes obtained in the time length obtaining process is changed.

* * * * *